United States Patent
Terahama et al.

(10) Patent No.: US 7,031,997 B2
(45) Date of Patent: *Apr. 18, 2006

(54) METHOD AND APPARATUS FOR CONNECTING TERMINALS IN A REMOTE CONSULTING SYSTEM

(75) Inventors: Yukinori Terahama, Yao (JP);
Hirotaka Mizuno, Ikeda (JP);
Masatoshi Oomura, Owariasahi (JP)

(73) Assignee: Hitachi, Ltd., Tokyo (JP)

(*) Notice: Subject to any disclaimer, the term of this patent is extended or adjusted under 35 U.S.C. 154(b) by 804 days.

This patent is subject to a terminal disclaimer.

(21) Appl. No.: 09/846,615

(22) Filed: May 2, 2001

(65) Prior Publication Data
US 2001/0032242 A1    Oct. 18, 2001

Related U.S. Application Data

(63) Continuation of application No. 08/934,063, filed on Sep. 19, 1997, now Pat. No. 6,256,661.

(30) Foreign Application Priority Data
Sep. 20, 1996   (JP)   ................................ 8-249609

(51) Int. Cl.
*G06F 15/16* (2006.01)
(52) U.S. Cl. .................. 709/201; 709/220; 709/224; 714/10; 714/40; 714/48
(58) Field of Classification Search ................ 709/201, 709/220, 223, 224, 241; 707/6, 9, 103; 714/48, 714/43, 235; 719/315; 379/38, 145, 88; 703/2; 700/110; 370/254, 218; 725/110; 715/804; 717/120
See application file for complete search history.

(56) References Cited

U.S. PATENT DOCUMENTS 4,700,340 A * 10/1987 Beranek et al. ............. 370/218
4,922,519 A    5/1990 Daudelin .................... 379/67

(Continued)

FOREIGN PATENT DOCUMENTS

JP          7168889          7/1995

OTHER PUBLICATIONS

A Distributed Connection Manager Interface for Web Services on IBM . . . —Liu (1996) ; www.research.ibm.com/webvideo/cmd.ps.*

(Continued)

*Primary Examiner*—Thong Vu
(74) *Attorney, Agent, or Firm*—Mattingly, Stanger, Malur & Brundidge, P.C.

(57) ABSTRACT

When a remote service terminal is to be connected, the present invention executes the following procedure. The lobby terminal selects a clerk terminal which can correspond to a consulting detail and the selected clerk terminal is connected to the lobby terminal and carries out a remote consultation. When the lobby terminal selects an unattended agent server, the lobby terminal retrieves the past reply corresponding to the consulting detail of the user and displays it at the lobby terminal. When the clerk terminal corresponding to the consulting detail becomes connectable while the unattended agent server is corresponding to the user of the lobby terminal, the unattended agent server takes over the consulting detail to the clerk terminal. When there is no clerk terminal to be changed when the consultation is over, the unattended agent server sends the inquiry data which is to be replied to the user asynchronously to the clerk terminal by a communication means separately.

9 Claims, 19 Drawing Sheets

U.S. PATENT DOCUMENTS

| | | | | |
|---|---|---|---|---|
| 4,939,771 | A | 7/1990 | Brown et al. | 379/67 |
| 4,982,344 | A * | 1/1991 | Jordan | 715/804 |
| 5,053,956 | A | 10/1991 | Donald et al. | 395/560 |
| 5,138,377 | A * | 8/1992 | Smith et al. | 399/11 |
| 5,220,674 | A * | 6/1993 | Morgan et al. | 709/223 |
| 5,311,422 | A * | 5/1994 | Loftin et al. | 703/2 |
| 5,317,725 | A * | 5/1994 | Smith et al. | 714/27 |
| 5,444,615 | A * | 8/1995 | Bennett et al. | 705/8 |
| 5,469,206 | A | 11/1995 | Strubbe et al. | 348/7 |
| 5,581,753 | A | 12/1996 | Terry et al. | 707/201 |
| 5,586,175 | A | 12/1996 | Hogan et al. | 379/112 |
| 5,621,884 | A * | 4/1997 | Beshears et al. | 714/10 |
| 5,633,910 | A * | 5/1997 | Cohen | 379/38 |
| 5,673,253 | A | 9/1997 | Shafter | 370/229 |
| 5,703,935 | A | 12/1997 | Raissyan et al. | 379/88 |
| 5,712,978 | A * | 1/1998 | Lerner et al. | 709/224 |
| 5,713,027 | A * | 1/1998 | Soejima et al. | 713/300 |
| 5,721,817 | A | 2/1998 | Kurihara et al. | 709/239 |
| 5,724,516 | A * | 3/1998 | Temoshenko | 709/202 |
| 5,729,745 | A * | 3/1998 | Reina et al. | 719/315 |
| 5,751,943 | A * | 5/1998 | Benzenberg et al. | 714/40 |
| 5,751,965 | A * | 5/1998 | Mayo et al. | 709/224 |
| 5,758,071 | A * | 5/1998 | Burgess et al. | 709/220 |
| 5,764,914 | A | 6/1998 | Goto et al. | 709/227 |
| 5,764,916 | A | 6/1998 | Busey et al. | 395/200.57 |
| 5,774,669 | A * | 6/1998 | George et al. | 709/224 |
| 5,778,377 | A * | 7/1998 | Marlin et al. | 707/103 R |
| 5,781,703 | A * | 7/1998 | Desai et al. | 706/50 |
| 5,793,365 | A | 8/1998 | Tang et al. | 345/329 |
| 5,799,151 | A | 8/1998 | Hoffer | 709/204 |
| 5,799,273 | A * | 8/1998 | Mitchell et al. | 704/235 |
| 5,805,786 | A | 9/1998 | Burghardt et al. | 395/182.02 |
| 5,805,823 | A | 9/1998 | Seitz | 709/236 |
| 5,812,780 | A | 9/1998 | Chen et al. | 709/224 |
| 5,819,267 | A * | 10/1998 | Uyama | 707/6 |
| 5,825,856 | A | 10/1998 | Porter et al. | 379/93.12 |
| 5,862,330 | A | 1/1999 | Anupam et al. | 395/200.34 |
| 5,870,721 | A | 2/1999 | Norris | 705/38 |
| 5,903,725 | A | 5/1999 | Colyer | 709/203 |
| 5,909,543 | A | 6/1999 | Tanaka et al. | 709/204 |
| 5,915,008 | A | 6/1999 | Dulman | 379/201 |
| 5,933,412 | A | 8/1999 | Choudhury et al. | 370/218 |
| 5,940,614 | A * | 8/1999 | Allen et al. | 717/120 |
| 5,944,795 | A | 8/1999 | Civanlar | 709/227 |
| 5,958,013 | A | 9/1999 | King et al. | 709/227 |
| 5,964,837 | A * | 10/1999 | Chao et al. | 709/224 |
| 5,966,531 | A * | 10/1999 | Skeen et al. | 719/315 |
| 5,995,604 | A * | 11/1999 | Chan et al. | 379/145 |
| 6,016,335 | A * | 1/2000 | Lacy et al. | 379/67.1 |
| 6,021,262 | A * | 2/2000 | Cote et al. | 714/48 |
| 6,161,201 | A * | 12/2000 | Payne et al. | 714/43 |
| 6,184,885 | B1 * | 2/2001 | DeStefano | 715/804 |
| 6,256,661 | B1 * | 7/2001 | Terahama et al. | 709/201 |
| 6,298,346 | B1 * | 10/2001 | Kurosawa | 707/9 |
| 6,308,221 | B1 * | 10/2001 | Perlman et al. | 709/241 |
| 6,353,930 | B1 * | 3/2002 | Shimoji et al. | 725/110 |
| 6,385,497 | B1 * | 5/2002 | Ogushi et al. | 700/110 |

OTHER PUBLICATIONS

The Evolution of Emergent Computation—Crutchfield, Mitchell (1995) ; www.santafe.edu/~evca/Papers/EvEm-Comp.ps.gz.*

Distributed Objects: an approach to sharing multimedia . . . —Pinto, Bernardo (1996); mariel.inesc.pt/pub/papers/icdp96.ps.gz.*

Defining Policies for Performance Management in Open . . . —Meyer, Popien (1994) ; www-i4.informatik.rwth-aachen.de/RESEARCH/Papers/1994/94-meye-1.ps.gz.*

Second Generation Expert Systems, Explanations, Arguments and . . . —Stutt ; hcrl.open.ac.uk/web/techreports/papers/tr25.ps.g.*

Viewpoints—Providing Explanation for Different Classes of . . . —Ian Finch ; www.csc.liv.ac.uk/~ian/Publications/es93.ps.*

Neurosymbolic Integration: Unified versus Hybrid Approaches—Hilario, Lallement . . . (1995) ; www.cs.cmu.edu/~yannick/hilario.neuro-symbolic95.ps.gz.*

A Method for Conceptual Modelling of Real-Time Expert Systems . . . —Aijun An ; ftp.lri.fr/LRI/articles/pierret/KEML/SUBM.OLD/aijun.ps.* matthias.dyn.meta.net.nz/rfc/rfc876.txt; matthias.dyn.meta.net.nz/rfc/rfc876.txt.*

Permutation on the Mesh with Reconfigurable Bus: Algorithms . . . —Yen-Wen Lu James (1993) www-star.stanford.edu/~yenwen/segment.ps.*

Scaling Up Rule-Based Software Development Environments—Naser Barghouti Gail (1991) ftp.cs.columbia.edu/pub/marvel/ijseke92.ps.gz.*

Y. Kobayashi, "A New Stream in Telemarketing Fusion of C/S System and PBX", Nikkei Computer, Nikkei PB Inc., Aug. 7, 1995, No. 371, pp. 67-69.

S. Nakagawa, et al "Remote User Support System on Campus Network", IPSJ SIG Notes, Information Processing Society of Japan, May 24, 1996, vol. 96, No. 52, pp. 17-24.

* cited by examiner

FIG. 3

| EXPERT CLERK CODE | AREA CODE | STATION CODE | TERMINAL ID CODE | CONSULTING FREQUENCY WHILE THE CLERK TERMINAL CONNECTS SERVER | CONNECTIVE STATUS CODE |
|---|---|---|---|---|---|
| 1101 | 1102 | 1103 | 1104 | 1105 | 1106 |
| 0001 | 10 | 2 | 0300 | 1 | 0 |

| EXPERT CLERK CODE | LOGIN CODE | CONSULTING FREQUENCY WHILE THE CLERK TERMINAL CONNECTS SERVER | STATION CODE | PRIORITY DECISION CODE |
|---|---|---|---|---|
| 1201 | 1202 | 1203 | 1204 | 1205 |
| 0001 | 8:30 | 1 | 2 | A |

| LOBBY TERMINAL ID CODE | LOBBY TERMINAL STATUS | SELECTED EXPERT CLERK CODE | CONSULTING DETAIL | CONSULTING TIME |
|---|---|---|---|---|
| 1301 | 1302 | 1303 | 1304 | 1305 |
| U0001 | CONSULTING | 0001 | DERIVATIVE | 0:30 |

| LOBBY TERMINAL ID CODE (2101) | LOBBY TERMINAL STATUS (2102) |
|---|---|
| U0001 | CONSULTING |

| LIST NUMBER (2201) | EXPERT CLERK CODE (2202) | AREA CODE (2203) | STATION CODE (2204) | TERMINAL ID CODE (2205) |
|---|---|---|---|---|
| 1 | 0001 | 10 | 2 | 0300 |
| 2 | 0050 | 15 | 3 | 0101 |
|  |  |  |  |  |

| LIST NUMBER | EXPERT CLERK CODE | TERMINAL ID CODE |
|---|---|---|
| 1 | 0001 | 0300 |

FIG. 9

| EXPERT CLERK CODE | AREA CODE | STATION CODE | TERMINAL ID CODE | LOGIN CODE |
|---|---|---|---|---|
| 0001 | 10 | 2 | 0300 | 8:30 |

FIG. 10

| LOBBY TERMINAL ID CODE | LOBBY TERMINAL STATUS | CONSULTING DETAIL | CODE FOR TAKING OVER THE CONSULTING DETAIL |
|---|---|---|---|
| U0001 | CONSULTING | DERIVATIVE | H001 |

FIG. 11

| EXPERT CLERK CODE (4301) | TERMINAL ID CODE (4302) | LOGOUT CODE (4303) | JUDGEMENT CODE FOR END OF CONSULTATION (4304) |
|---|---|---|---|
| 0001 | 0300 | 17:00 | 0 |

| LOBBY TERMINAL ID CODE (3101) | LOBBY TERMINAL STATUS (3102) | CONSULTING DETAIL (3103) | CODE FOR TAKING OVER THE CONSULTING DETAIL (3104) | Q & A CODE ABOUT CONSULTATION (3105) |
|---|---|---|---|---|
| U0001 | CONSULTING | DERIVATIVE | H001 | C200 |

| Q & A CODE ABOUT CONSULTATION (3201) | CONSULTING DETAIL (3202) | LOBBY TERMINAL ID CODE (3203) | EXPERT CLERK CODE (3204) | DATE OF STORAGE (3205) |
|---|---|---|---|---|
| C200 | DERIVATIVE | U0001 | 0001 | 9607051500 |

3200

METHOD AND APPARATUS FOR CONNECTING TERMINALS IN A REMOTE CONSULTING SYSTEM

This is a continuation of application Ser. No. 08/934,063, filed Sep. 19, 1997 now U.S. Pat. No. 6,256,661.

BACKGROUND OF THE INVENTION

The present invention relates to a method and apparatus for connecting a lobby terminal to a special clerk terminal for corresponding to a consulting detail in a remote consulting support system using a network.

As one of the connection methods between a lobby terminal and a remote service terminal, there is a method of realizing dispersion of processing load for avoiding concentrated connection to a specific terminal. This is a method that a remote service manager controlling remote service terminals for supplying information in a uniform manner sounds out each remote service terminal as to whether information can be supplied. When each remote service terminal sounded can correspond to it, each terminal returns the load value thereof to the remote service manager. The remote service manager selects the remote service terminal having the minimum among the load values returned from the remote service terminals, connects the terminal, and supplies information to it. A prior art for realizing such a function is described in Japanese Patent Application Laid-Open 5-134959.

In a remote consulting system using general telephones, a counselor in charge of consultation sends information that he leaves his seat to the communication control unit for batch controlling telephone connection when he leaves his seat. When a user inquires the counselor who cannot correspond because he leaves his seat and is out, the communication control unit stores the inquiry information from the user in the communication control unit. When the counselor takes his seat and sends information of cancel of leaving his seat to the communication control unit, the communication control unit sends the inquiry information sent to the counselor during leaving his seat to the counselor. As a result, even if the counselor is not always in the corresponding state, he can receive an inquiry from a user and can reply to the user though asynchronously. A prior art for realizing such a function is described in Japanese Patent Application Laid-Open 7-74844.

In the aforementioned prior arts, whenever the remote service manager for batch controlling the remote service terminals, decides the remote service terminal to be connected, the remote service manager aeces ses each remote service terminal and reads and decides information (load value) about connectable or not. Each remote service terminal requires a process of changing the load value of the own terminal whenever it is connected. Furthermore, in this case, the batch controlling remote service manager judges the decision of the remote service terminal to be connected on the basis of only the load values of all the remote service terminals. Therefore, even if the consulting detail is the same, a specific remote service terminal cannot be always connected. Therefore, a terminal such that a special expert clerk corresponding to a specific consulting detail operates from a remote service terminal cannot be connected.

In a remote consulting system using general telephones, if an inquiry is made from a user when an operator is leaving his seat, the user designates a specific operator and makes an inquiry. Therefore, even if an operator who can correspond to the same consultation enters the correspondable state during inquiry, the connection to the user cannot be changed. As a result, unless a reply is given from the designated operator, the inquiry information is kept stored in the batch controlling communication control unit.

SUMMARY OF THE INVENTION

An object of the present invention is to provide a mechanism for selecting an expert clerk who is able to connect to a lobby terminal used by a user, to provide a service regarding a consulting detail even if the expert clerk cannot be connected, and to take over the consultation promptly when the expert clerk enters the connectable state.

To accomplish the object of the present invention, the present invention connects a lobby terminal to a clerk terminal conforming to the consulting detail of the user according to the main procedure indicated below.

(1) The user sends "clerk call" information for connecting the clerk terminal to the server for making a connection with clerk terminals from the lobby terminal.

(2) The lobby terminal receives the information from the server for making a connection with clerk terminals for batch controlling the operating statuses of the clerk terminals and displays a list of connectable expert clerks.

(3) The user operating the lobby terminal selects an expert clerk who can correspond to the consulting detail from the displayed list of expert clerks.

(4) The clerk terminal operated by the selected expert clerk is connected to the lobby terminal operated by the user for communication and the expert clerk holds a remote consultation using functions such as video conference and display screen sharing.

On the other hand, when a special expert clerk is in the consultation ready state in the clerk terminal, the clerk terminal waits for connection from the lobby terminal according to the following procedure.

(5) The special expert clerk sends an information data that is able to connect to the server for making a connection with clerk terminals for controlling the clerk terminals in a uniform manner from the clerk terminal. The server for making a connection with clerk terminals counts the past consulting frequency of connectable expert clerks, sets the consultation connectable priority level when there are a plurality of expert clerks in charge of the same consulting detail, and displays a list on the lobby terminal.

(6) When an expert clerk is connected to the clerk terminal by clerk call from the lobby terminal, the clerk terminal cannot be connected from another lobby terminal, so that the server for making a connection with clerk terminals controlling in a uniform manner selects an unconnectable clerk terminal and deletes it from the list of connectable expert clerks.

(7) When the consultation ends, the clerk terminal disconnects the line with the lobby terminal, sends information that the expert clerk becomes connectable again to the server for making a connection with clerk terminals, and waits for connection from the lobby terminal.

When an expert clerk who can correspond to consultation of the user is not displayed in the list of connectable expert clerks displayed on the lobby terminal, the server selects an unattended agent server and corresponds to consultation of the user according to the following procedure.

(8) When the expert clerk selects an unattended agent server from the list of connectable expert clerks displayed on the lobby terminal, the lobby terminal sends the consulting detail of the user to the unattended agent server, searches for a past reply case corresponding to the consulting detail (the inquiry from the user is included), and displays it on the lobby terminal. When there is no reply case corresponding to the inquiry, the inquiry from the user is stored in the unattended agent server.

(9) When the expert clerk corresponding to the consulting detail becomes connectable while the unattended agent server is corresponding to the user of the lobby terminal, the server for making a connection with clerk terminals switches the unattended agent server to the connectable clerk terminal and sends the previous exchange (inquiry and relay) data with the user to the clerk terminal.

(10) When there is no expert clerk who can correspond to the consulting detail until the correspondence with the user of the lobby terminal ends, the unattended agent server asynchronously sends the inquiry detail from the user to the terminal used by the corresponding expert clerk and sends a relay to the user by using a communication (FAX, telephone, etc.) means separately.

BRIEF DESCRIPTION OF THE DRAWINGS

FIG. 3 is a table constitution of a control table of clerk terminal connection.
FIG. 4 is a table constitution of a control table of priority connection of clerk terminal.
FIG. 5 is a table constitution of a control table lobby terminal connection.
FIG. 6 is a table constitution of a connective table to clerk terminal (call instruction).
FIG. 7 is a table constitution of a display table of clerk terminal codes able to connect to lobby terminals.
FIG. 8 is a table constitution of a selective table of clerk terminal able to connect to lobby terminal.
FIG. 9 is a table constitution of a register table of clerk terminal code able to connect to server.
FIG. 10 is a table constitution of a control table of a connection with clerk terminal.
FIG. 11 is a table constitution of a completion table of a connection with clerk terminal.
FIG. 12 is a table constitution of a supplemental table of consultative information.
FIG. 13 is a table constitution of a store table of consultative inquiry and reply data.

DESCRIPTION OF THE PREFERRED EMBODIMENTS

Figure 1:
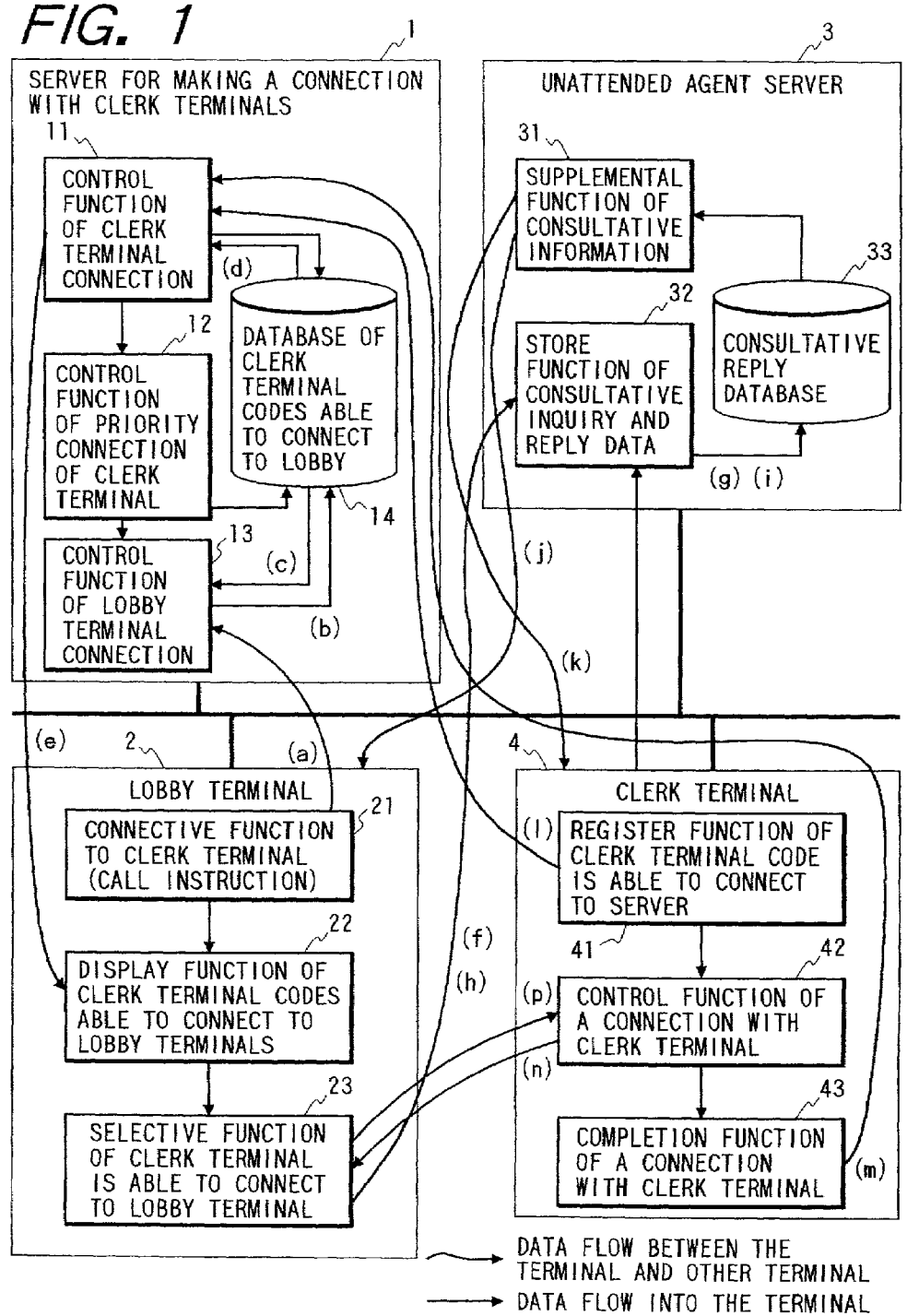
FIG. 1 is a system block diagram of the present invention.

The first embodiment of the present invention will be explained hereunder. Symbols (a), (b), and others quoted in the following explanation indicate the correspondence with data flow between the terminal and other terminal and data flow into the terminal. FIG. 1 shows a system constitution for realization of the present invention. As shown in FIG. 1, in this system, a plurality of lobby terminals 2 for use by a user when requesting consultation, a plurality of clerk terminals 4 used by a special expert clerk, a server for making a connection with clerk terminals 1 for controlling the connective status of the clerk terminals 4 in a uniform manner when the lobby terminals 2 are connected to the clerk terminals 4, and an unattended agent server 3 for corresponding to an inquiry from the user when there is no expert clerk who can correspond to a consultation from the lobby terminals 2 are connected via a network.

The server for making a connection with clerk terminals 1 has a database 14 of clerk terminal codes able to connect to lobby terminals for controlling information on a clerk terminal which is able to connect in a uniform manner and performs a control function 11 of clerk terminal connection for selecting a connectable expert clerk using data stored in the database 14 of clerk terminal codes able to connect to lobby terminals, a control function 12 of priority connection of clerk terminal for deciding the connection priority to the lobby terminals 2 according to the past consulting frequency of an expert clerk, and a control function 13 of lobby terminal connection for controlling the lobby terminals 2.

The lobby terminals 2 perform a connective function 21 to clerk terminal (call instruction) for sending connection request information for connecting to the clerk terminals 4 to the server 1 for making a connection with clerk terminals 1, a display function 22 of clerk terminal codes able to connect to lobby terminals for displaying a list of clerk terminals able to connect to the server 1 for making a connection with clerk terminals on the lobby terminals 2, and a selective function 23 of clerk terminal able to connect to lobby terminal for connecting to the clerk terminal 4 selected from the displayed clerk terminal codes (p).

The unattended agent server 3 has a consultative reply database 33 storing the past consultative reply data for an inquiry of a user from the connected lobby terminal 2 and performs a supplemental function 31 of consultative information for supplying information corresponding to the inquiry detail to the lobby terminal 2 and a store function 32 of consultative inquiry and replay data for inquiring so as to take over the previous corresponding process and to store reply data when the terminal is changed to the clerk terminal 4 during correspondence with the consultation from the lobby terminal 2.

The clerk terminals 4 perform a register function 41 of clerk terminal code able to connect to server for sending information that an expert clerk is able to connect to the server 1 for making a connection with clerk terminals 1 for controlling the plurality of clerk terminals 4 in a uniform manner, a control function 42 of a connection with clerk terminal for controlling (n) after connection with the lobby terminals 2 and controlling taking over of consultation from the unattended agent server 3, and a completion function 43 of a connection with clerk terminal for breaking the connection with the lobby terminals 2 after the consultation ends and newly sending information that connection is able from the lobby terminals 2 to the server for making a connection (m) with clerk terminals 1.

Figure 2:
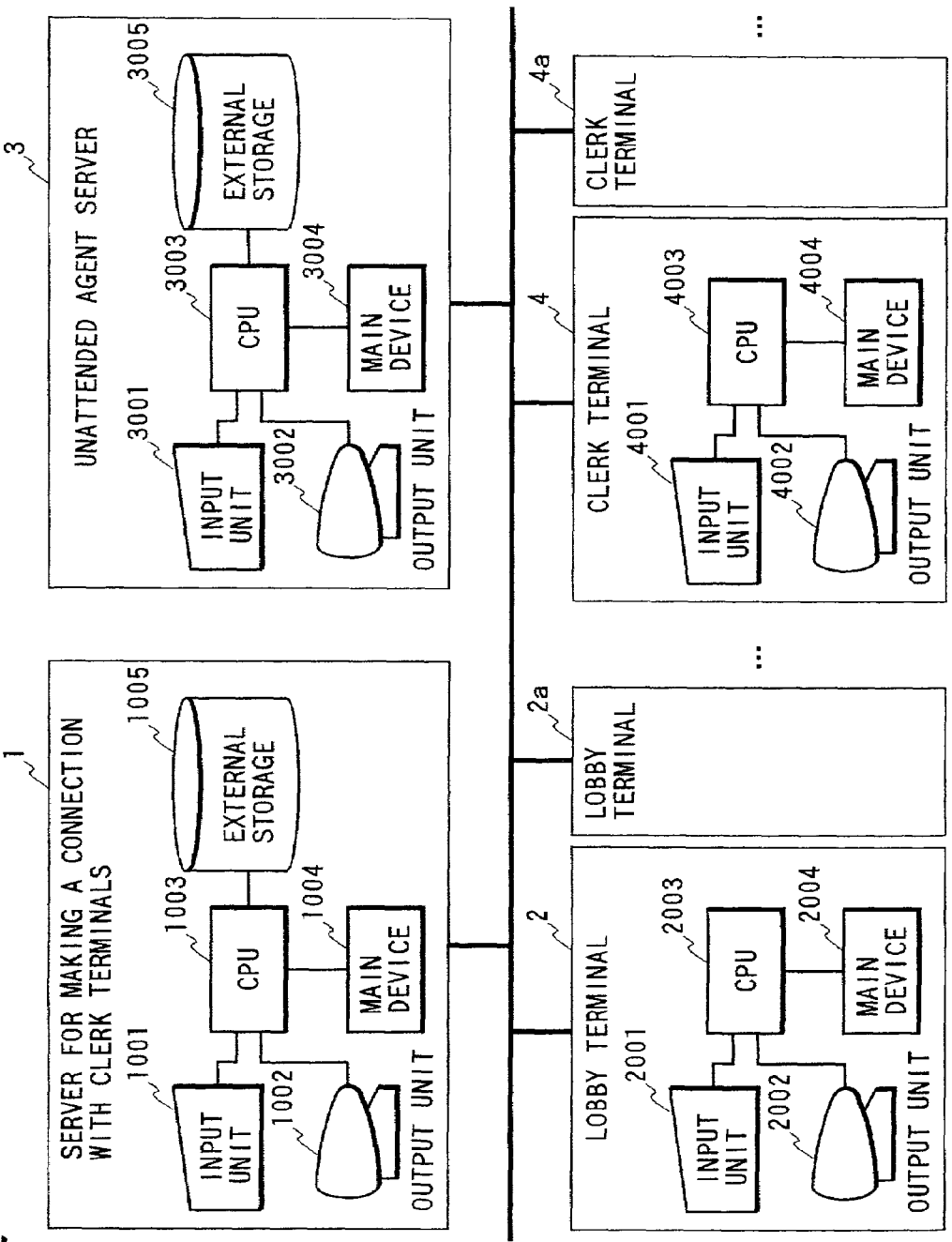
FIG. 2 is a hardware and network constitution for realizing the system constitution of the present invention.

Next, FIG. 2 shows a hardware constitution for realizing the process shown in FIG. 1. The server 1 for making a connection with clerk terminals, a plurality of lobby terminals 2 and 2a, the unattended agent server 3, and a plurality of clerk terminals 4 and 4a are connected to each other via a network such as Ethernet.

The server 1 for making a connection with clerk terminals comprises an input unit 1001, an output unit 1002, a CPU 1003 for executing the process shown in FIG. 1, a main device 1004 for temporarily preserving a processing program and data in the table, and an external storage 1005 for storing a database.

The lobby terminal 2 comprises an input unit 2001, an output unit 2002, a CPU 2003 for executing a process, and a main device 2004.

The unattended agent server 3 comprises an input unit 3001, an output unit 3002, a CPU 3003, a main device 3004, and an external storage 3005 same as with the server 1 for making a connection with clerk terminals mentioned above.

The clerk terminal 4 comprises an input unit 4001, an output unit 4002, a CPU 4003, and a main device 4004 same as with the lobby terminal 2 mentioned above.

Next, a table for performing the process in each terminal (server included) is shown in FIG. 1 and the table constitution of the database 14 of clerk terminal codes able to connect to lobby terminals and of the consultative reply database 33 will be described.

Firstly, a control table of clerk terminal connection 1100 for the control function 11 of clerk terminal connection in the server for making a connection with clerk terminals 1 shown in FIG. 1 is shown in FIG. 3. The control table of clerk terminal connection 1100 shown in FIG. 3 comprises an expert clerk code field 1101 for storing an expert clerk code corresponding to a user, an area code field 1102 for storing an area code where an expert clerk exists, a station code field 1103 for storing a station code to which an expert clerk belongs, a terminal ID code field for storing the terminal ID of the clerk terminal 4, a consulting frequency field 1105 while the clerk terminal connects server for storing the consulting frequency while the clerk terminal connects to server in the clerk terminal 4 by an expert clerk, and a connective status code field 1106 for storing the code corresponding to the connective status of the clerk terminal 4.

Next, a control table of priority connection of clerk terminal 1200 for the control function 12 of priority connection of clerk terminal in the server for making a connection with clerk terminals 1 is shown in FIG. 4. The control table 1200 of priority connection of clerk terminal shown in FIG. 4 comprises an expert clerk field 1201 for storing the expert clerk code stored in the expert clerk code field 1101 shown in FIG. 3, a login time field 1202 for storing a login time of an expert clerk from the clerk terminal 4, a consulting frequency field 1203 while the clerk terminal connects server for storing the consulting frequency data stored in the consulting frequency field while the clerk terminal connects server 1105 shown in FIG. 3, a station code field 1204 for storing the station code stored in the station code field 1103 shown in FIG. 3, and a priority judgment code field 1205 for storing a clerk terminal priority code of a connectable expert clerk.

Next, a control table of lobby terminal connection 1300 for the control function 13 of lobby terminal connection in the server 1 for making a connection with clerk terminals is shown in FIG. 5. The control table of lobby terminal connection 1300 shown in FIG. 5 comprises a lobby terminal ID code field 1301 for storing a lobby terminal ID code to be connected, a lobby terminal status field 1302 for storing the status of the lobby terminal in the connective status, a selected expert clerk code field 1303 for storing an expert clerk code corresponding to an expert clerk selected from the lobby terminal, a consulting detail field 1304 for storing a consulting detail after consultation start, and a consulting time field 1305 for storing a consulting time after consultation start.

Next, a processing table 2100 of clerk terminal for the connective function 21 to clerk terminal (call function) in the lobby terminal 2 shown in FIG. 1 is shown in FIG. 6. The processing table 2100 of clerk terminal shown in FIG. 6 comprises a lobby terminal ID code field 2101 for storing the corresponding lobby terminal ID code and a lobby terminal status field 2102 for storing the connective status of the lobby terminal.

Next, a display table 2200 of clerk terminal codes able to connect to lobby terminals for the display function 22 of clerk terminal codes able to connect to lobby terminals in the lobby terminal 2 is shown in FIG. 7. The display table 2200 of clerk terminal codes able to connect to lobby terminals shown in FIG. 7 comprises a list number field 2201 for storing numbers in the listing order, an expert clerk code field 2202 for storing a connectable expert clerk code, an area code field 2203 for storing the area code of each expert clerk, a station code field 2204 for storing the station code of each expert clerk, and a terminal ID code field 2205 for storing the terminal ID code of the clerk terminal 4 corresponding to each expert clerk.

Next, a selective table 2300 of clerk terminal able to connect to lobby terminal for the selective function 23 of clerk terminal able to connect to lobby terminal in the lobby terminal 2 is shown in FIG. 8. The selective table 2300 of clerk terminal able to connect to lobby terminal shown in FIG. 8 comprises a list number field 2301 for storing a selected list number, an expert clerk code field 2302 for storing an expert clerk code, and a terminal ID code field 2303 for storing the terminal ID code of the clerk terminal 4 corresponding to each expert clerk.

Next, a register table 4100 of clerk terminal code able to connect to server for the register function of clerk terminal code cable to connect co server in the clerk terminal 4 shown in FIG. 1 is shown in FIG. 9. The register table 4100 of clerk terminal code able to connect to server shown in FIG. 9 comprises an expert clerk code field 4101 for storing an expert clerk code using the clerk terminal, an area code field 4102 for storina the area code corresponding to the expert clerk stored in the expert clerk code field 4101, a station code field 4103 for also storing the station code corresponding to an expert clerk, a terminal ID code field 4104 for storing the terminal ID code of the clerk terminal, and a login time field 4105 for storing the time logged in the clerk terminal by an expert clerk.

Next, a control table 4200 of a connection with clerk terminal for the control function 42 of a connection with clerk terminal in the clerk terminal 4 is shown in FIG. 10. The control table 4200 of a connection with clerk terminal shown in FIG. 10 comprises a lobby terminal ID code field 4201 for storing the ID code of the connected lobby terminal 2, a lobby terminal status field 4202 for storing the lobby terminal status of the lobby terminal 2, a consulting detail field 4203 for storing a consulting detail from a user, and a code field 4204 for taking over the consulting detail for storing a code for taking over the consulting detail from the unattended agent server 3 shown in FIG. 1.

Next, a completion table 4300 of a connection with clerk terminal for the completion function 43 of a connection with clerk terminal in the clerk terminal 4 is shown in FIG. 11. The completion table 4300 of a connection with clerk terminal shown in FIG. 11 comprises an expert clerk code field 4301 for storing the expert clerk code stored in the expert clerk code field 4101 shown in FIG. 9, a terminal ID code field 4302 for storing the terminal ID code stored in the terminal ID code field 4104, a logout time field 4303 for storing the time logged out from the clerk terminal by an expert clerk, and a judgment code field for end of consultation 4304 for storing a code for judging the end of consultation.

Next, a supplemental table of consultative information 3100 for the supplemental function 31 of consultative information in the unattended agent server 3 shown in FIG. 1 is shown in FIG. 12. The supplemental table 3100 of consultative information shown in FIG. 12 comprises a lobby terminal ID code field 3101 for storing the lobby terminal ID code of the connected lobby terminal 2, a lobby terminal status field 3102 for storing the connective status of the lobby terminal, a consulting detail field 3103 for storing a consulting detail, a code field 3104 for taking over the consulting detail for storing a code for taking over to the clerk terminal (corresponding expert clerk), and a Q&A code field 3105 about consultation for storing a code corresponding to data of inquiry information from the lobby terminal 2 and reply data which are stored.

Next, a store table 3200 of consultative inquiry and reply data for the store function 32 of consultative inquiry and reply data in the unattended agent server 3 is shown in FIG. 13. The store table 3200 of consultative inquiry and reply data shown in FIG. 13 comprises a Q&A code field about consultation 3201 for storing the Q&A code about consultation stored in the Q&A code field 3105 about consultation shown in FIG. 12, a consulting detail field 3202 for storing the consulting detail stored in the consulting detail field 3103, a lobby terminal ID code field 3203 for storing the lobby terminal ID code stored in the lobby terminal ID code field 3101, an expert clerk code field 3204 for storing the expert clerk code of taking over the consulting detail, and a data store day field 3205 for storing the data store day that the Q&A code about consultation i@ stored.

Figure 14:
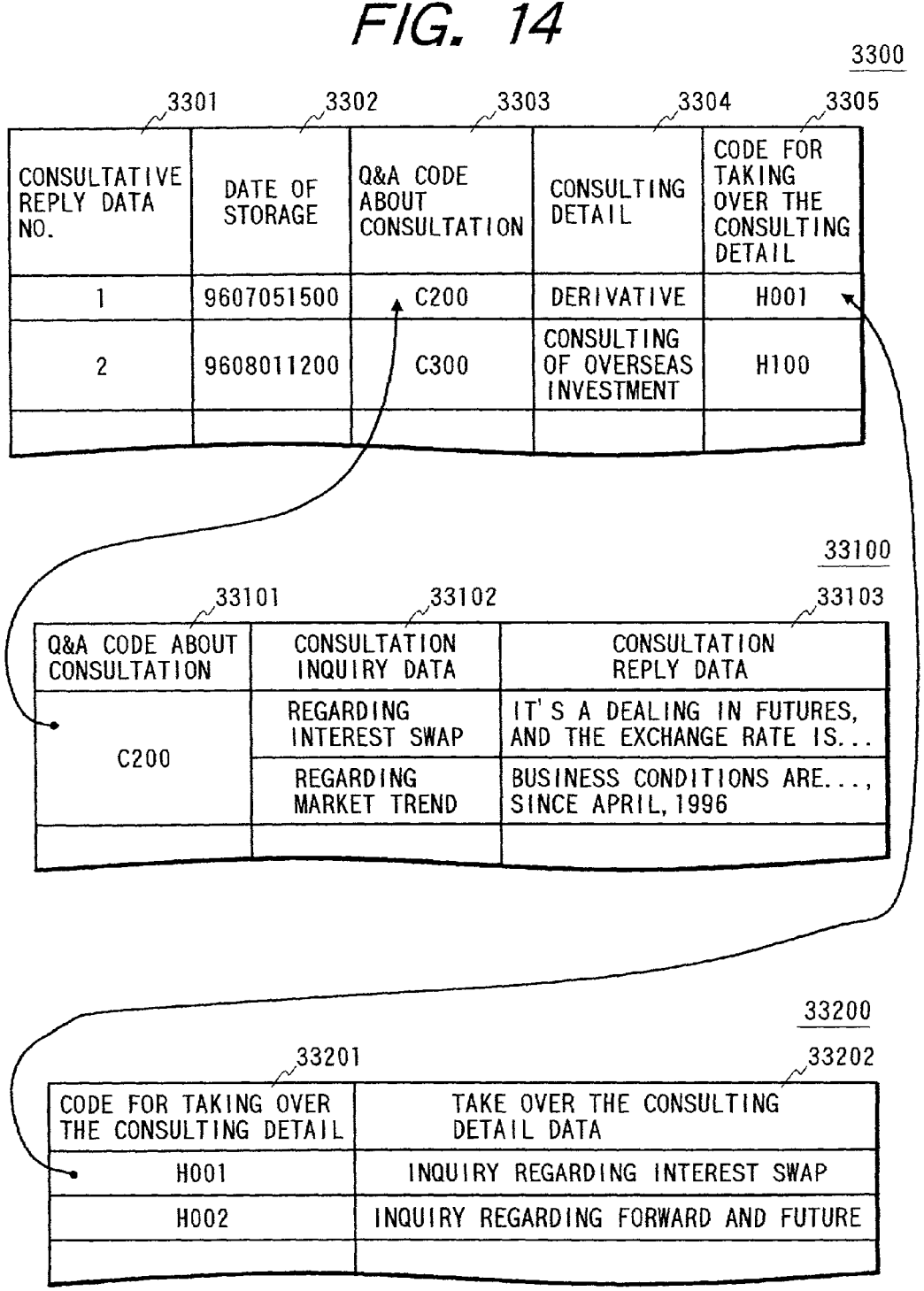
FIG. 14 is a table constitution of a consultative reply database.

Next, the table constitution of the consultative reply database 33 in the unattended agent server 3 is shown in FIG. 14. The table 3300 shown in FIG. 14 is a control table of consultative reply data and comprises a consultative reply data No. field 3301 storing the consultative reply data number, a data store day field 3302 storing the data store day, a Q&A code field 3303 about consultation storing a Q&A code about consultation, a consulting detail field 3304 storing a consulting detail, and a code field 3305 for taking over the consulting detail storing a code for taking over the consulting detail. A table 33100 is a table storing detailed data corresponding to a Q&A code about consultation and comprises a Q&A code field 33101 about consultation storing a Q&A code about consultation, a consultation inquiry data field 33102 storing consultation inquiry data from the lobby terminal 2, and a consultation reply data field 33103 storing consultation reply data to reply to the lobby terminal 2 from the unattended agent server 3. Next, a table 33200 is a table storing detailed data corresponding to a code for taking over the consulting detail and comprises a code field 33201 for taking over the consulting detail storing a code for taking over the consulting detail and a data field 33202 for taking over the consulting detail storing real data for taking over the consulting detail.

Figure 15:
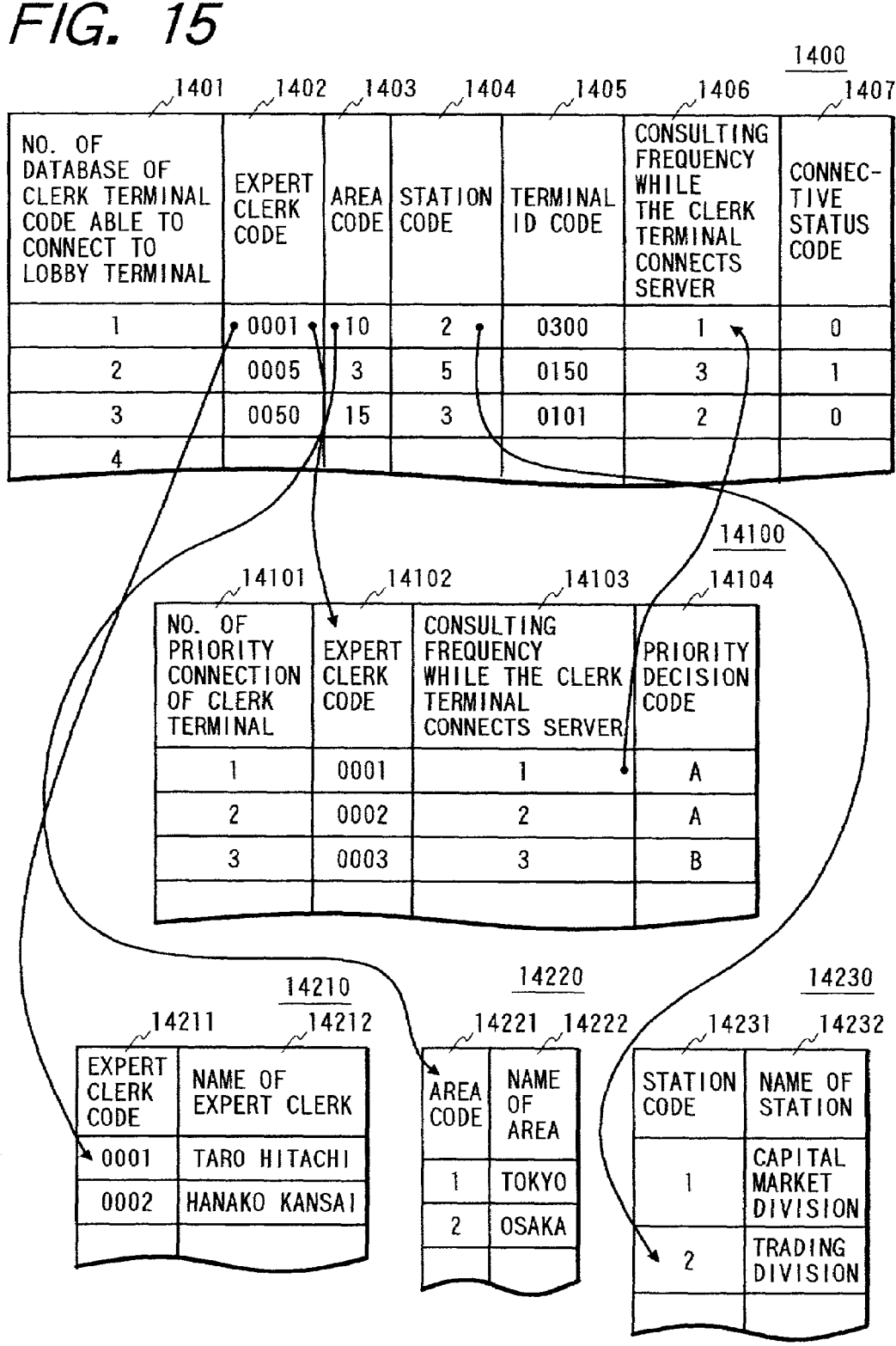
FIG. 15 is a table constitution of a database of clerk terminal codes able to connect to lobby terminals.

Next, the table constitution of the database 14 of clerk terminal codes able to connect to lobby terminals in the server for making a connection with clerk terminals 1 shown in FIG. 1 is shown in FIG. 15. The table 1400 shown in FIG. 15 is a table for controlling the connective status of the clerk terminal and comprises a number field 1401 of database of clerk terminal code able to connect to lobby terminal storing a number of database of clerk terminal code able to connect to lobby terminal, an expert clerk code field 1402 storing a connectable expert clerk code, an area code field 1403 storing an area code, a station code field 1404 storing a station code, a terminal ID code field 1405 storing the terminal ID code of the clerk terminal 4, a consulting frequency field 1406 while the clerk terminal connects server in which the consulting frequency while the clerk terminal connects server is stored by an expert clerk, and a connective status code field 1407 storing the connective status code of the clerk terminal 4.

Next, a table 14100 is a table storing the priority connection of clerk terminal and comprises a number field 14101 of priority connection of clerk terminal storing the number of priority connection of clerk terminal, an expert clerk code field 14102 storing an expert clerk code, a consulting frequency field 14103 while the clerk terminal connects server for storing the consulting frequency while the clerk terminal connects server, and a priority judgment code field 14104 for storing a priority judgment code. Next, a table 14210 is a table storing an expert clerk name corresponding to an expert clerk code and comprises an ex-pert clerk code field 14211 storing an expert clerk code and an expert clerk name field 14212 storing the corresponding expert clerk name. Next, a table 14220 comprises an area code field 14221 storing an area code and an area name field 14222 storing the corresponding area name. Next, a table 14230 comprises a station code field 14231 storing a station code and a station name field 14232 storing the corresponding station name.

Now, the explanation of the table for performing the process in each terminal (server included) shown in FIG. 1 and the table constitution of the database 14 of clerk terminal codes able to connect to lobby terminals and of the consultative reply database 33 ends.

Figure 16:
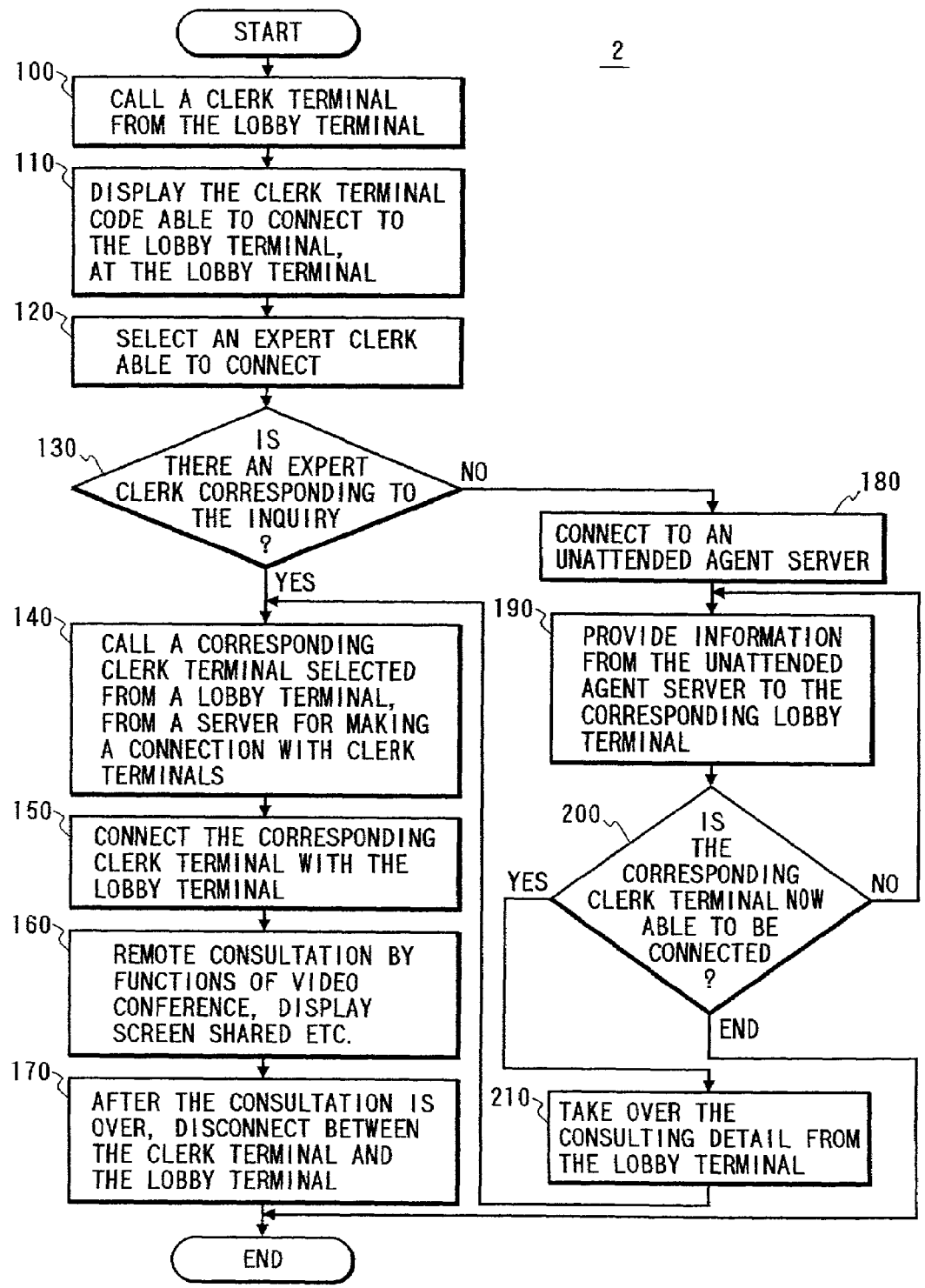
FIG. 16 is a flow chart showing an embodiment of the present invention mostly with a process at a lobby terminal.

Next, main processing steps by the lobby terminal on the basis of the system configuration shown in FIGS. 1 to 15, each table of the main device and external storage, and the constitution of the database table will be shown in FIG. 16.

At Step 100, an expert clerk is called by the connective function to clerk terminal (call instruction) 21 of the lobby terminal 2 shown in FIG. 1. Detailed processing at Step 100 will be described later by referring to FIG. 17. Next, at Step 110, the clerk terminal code able to connect to the lobby terminal taken out from the server for making a connection with clerk terminals 1 is displayed on the lobby terminal 2. Detailed processing at Step 110 will be described later by referring to FIG. 18. Next, at Step 120, an expert clerk able to connect is selected at the lobby terminal 2. Detailed processing at Step 120 will be described later by referring to FIG. 19. Next, at Step 130, it is decided whether the terminal selected at the lobby terminal 2 is the clerk terminal 4 or the unattended agent server 3. When the area codes 2203 of the table 2200 shown in FIG. 7 are all blank, no expert clerk is registered. Therefore, the unattended agent server 3 is selected. As a result of decision, a specific clerk terminal 4 is selected, the program goes to Step 140.

On the other hand, when there is no expert clerk corresponding to the inquiry and the unattended agent server 3 is selected, the program goes to Step 180. Next, at Step 140(*n*), the expert clerk code (1101) of the table 1100 shown in FIG. 3 corresponding to the expert clerk selected by the lobby terminal 2 shown in FIG. 1 at Step 120 is obtained and connection with the clerk terminal 4 corresponding to the terminal ID code (1104) corresponding to the obtained expert clerk code is requested to the control function 12 of clerk terminal connection of the server 1 for making a connection with clerk terminals. Next, at Step 150(P), communication is connected between the clerk terminal 4 whose connection is requested at Step 140 and the called lobby terminal 2. Next, at Step 160, remote consultation is carried out between the connected lobby terminal 2 and the clerk terminal 4 using functions of video conference, display screen shared, etc. Next, at Step 170(*m*), after end of the remote consultation, the communication between the connected lobby terminal 2 and the clerk terminal 4 is disconnected and the lobby terminal 2 is put into the state that it can correspond to another inquiry. On the other hand, at Step 180, communication is connected between the lobby terminal 2 and the unattended agent server 3. Detailed processing at Step 180 will be described later by referring to FIG. 20. Next, at Step 190, the past reply to the inquiry to the lobby terminal 2 from the user is searched from the consultative reply database 33 by the connected unattended agent server 3 and information is supplied to the lobby terminal 2 via the supplemental function 31 of consultative information. Detailed processing at Step 190 will be described later by referring to FIG. 21. Next, at Step 200, it is decided whether the expert clerk corresponding to the consulting detail is made connectable on the basis of the code setting status of the area code 2203 of the table 2200 shown in FIG. 7 during information supply from the unattended agent server 3. As a result of decision, when the expert clerk is unconnectable, the program returns to Step 190.

On the other hand, there is an expert clerk who is connectable, the program goes to Step 210. When the consultation ends, the communication between the lobby terminal 2 and the unattended agent server 3 is disconnected. Next, at Step 210, the inquiry data inputted by the user via the lobby terminal 2 and the consultative reply data sent to the lobby terminal from the unattended agent server 3 are sent (taking over the consulting detail) to the clerk terminal 4 which is changed in connection. Detailed processing at Step 210 will be described later by referring to FIG. 22.

Each step shown in FIG. 16 will be explained in detail hereunder.

Figure 17:
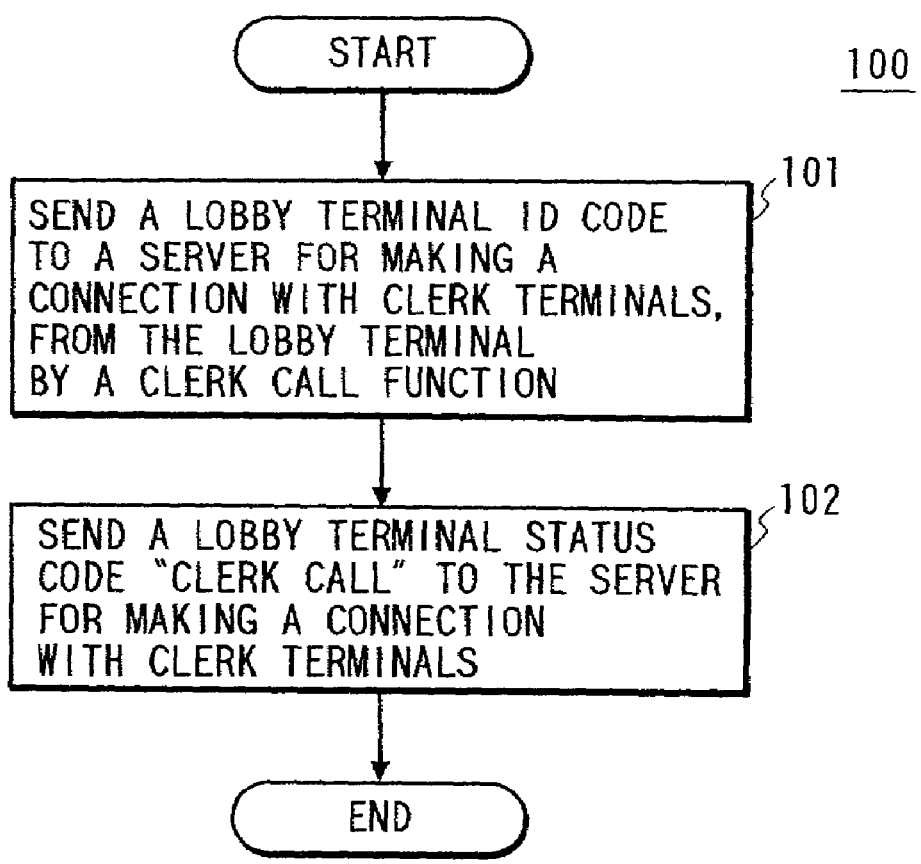
FIG. 17 is a detailed drawing of Step 100.

Step 100 will be explained in detail by referring to FIG. 17. As shown in FIG. 17, at Step 101, the lobby terminal ID code stored in the lobby terminal ID code field 2101 of the connective table 2100 to clerk terminal shown in FIG. 6 is sent to the control function 13 of lobby terminal connection of the server 1 for making a connection with clerk terminals by the connective function to clerk terminal (call instruction) 21 of the lobby terminal 2(*a*) and stored in the lobby terminal ID code field 1301 of the control table of lobby terminal connection 1300 shown in FIG. 5. Next, at Step 192, the connective status of the lobby terminal stored in the lobby terminal status field 2102 of the connective table 2100 to clerk terminal shown in FIG. 6 is sent to the control function of lobby terminal connection 13 of the server for making a connection with clerk terminals 1 and stored in the lobby terminal status field 1302 of the control table 1300 of lobby terminal connection shown in FIG. 5.

Figure 18:
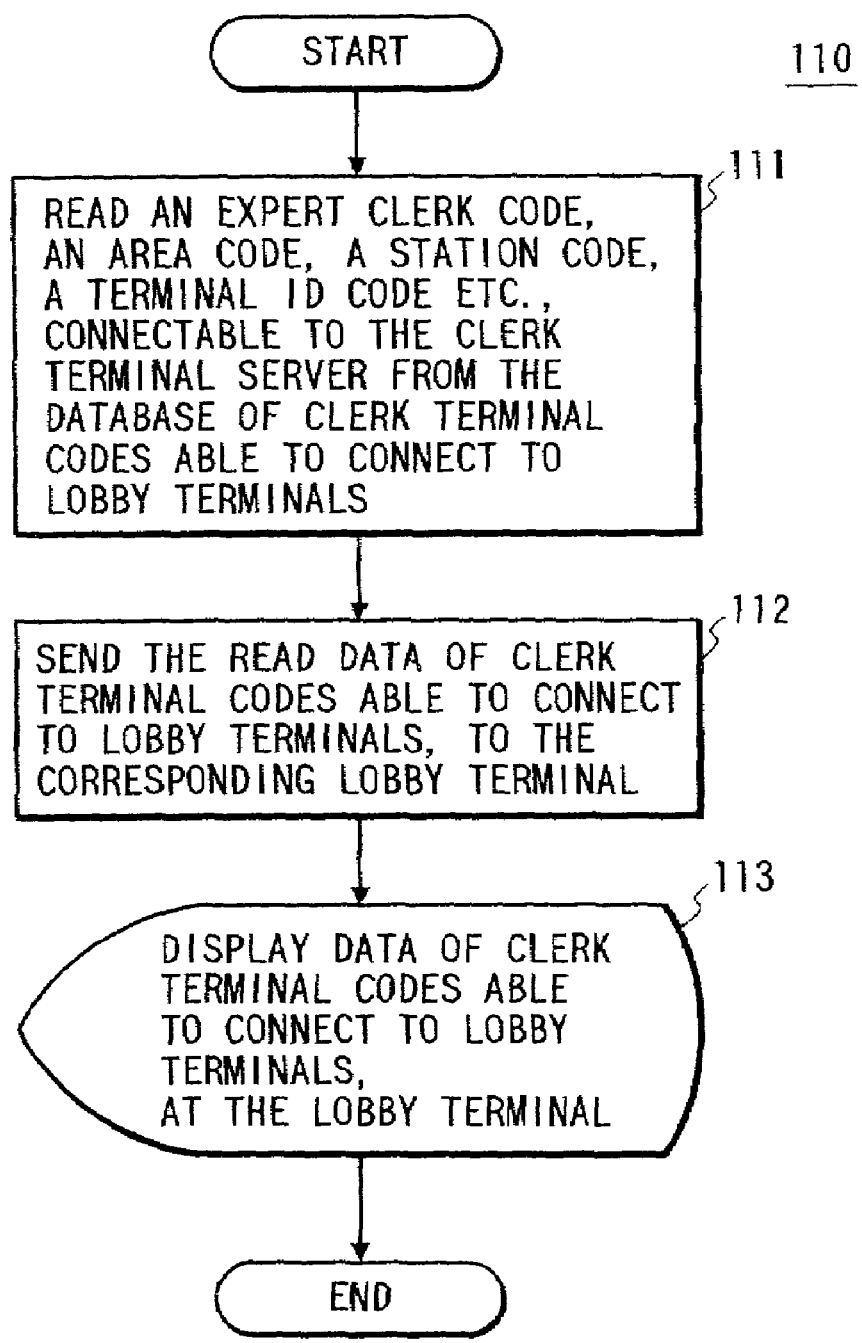
FIG. 18 is a detailed drawing of Step 110.

Next, Step 110 will be explained in detail by referring to FIG. 18. As shown in FIG. 18, at Step 111, the control function 11 of clerk terminal connection of the server 1 for making a connection with clerk terminals shown in FIG. 1 decides a connectable expert clerk from the database 14 of clerk terminal codes able to connect to lobby terminals by the connective status code, reads the expert clerk code, area code, station code, terminal ID code of the clerk terminal, consulting frequency while the clerk terminal connects server, and connective status code, and stores them in the control table of clerk terminal connection 1100 shown in FIG. 3. Next, at Step 112, the control function 11 of clerk terminal connection sends data such as the connectable expert clerk read at Step 111 to the display function 22 of clerk terminal codes able to connect to lobby terminals of the lobby terminal 2 shown in FIG. 1 and stores the expert clerk code, area code, station code, and terminal ID code of the clerk terminal in the display table 2200 of clerk terminal codes able to connect to lobby terminals shown in FIG. 7 in the sending order (e). Next, at Step 113, the control function 11 of clerk terminal connection outputs and displays the list of the connectable expert clerk (area name, station, expert clerk name) stored in the display table 2200 of clerk terminal codes able to connect to lobby terminals at Step 112 from the output unit 2002 in the lobby terminal 2 shown in FIG. 2. The correspondence between the expert clerk code, area code, and station code and the concrete expert clerk name, area name, and station name is converted by referring to the database tables 14210, 14220 and 14230 of clerk terminal codes able to connect to lobby terminals shown in FIG. 15.

Figure 19:
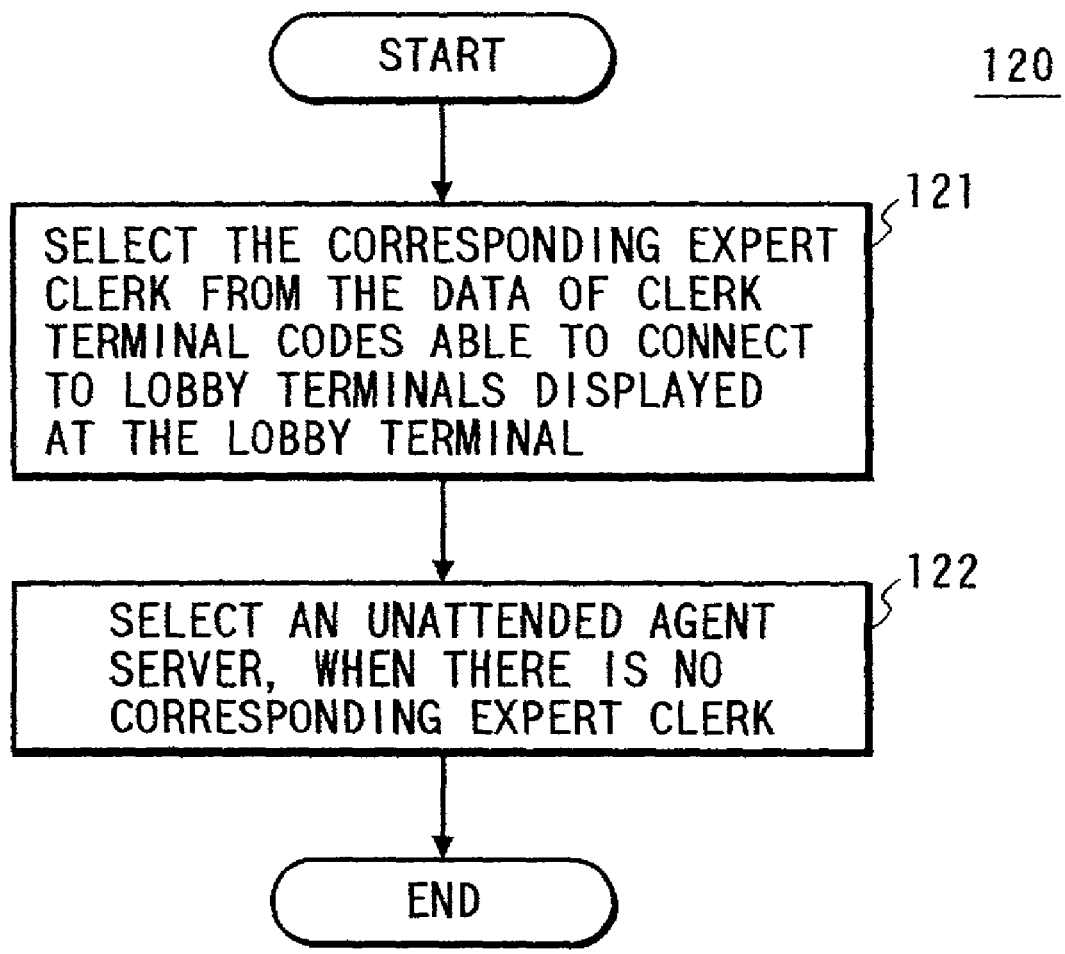
FIG. 19 is a detailed drawing of Step 120.

Next, Step 120 will be explained in detail by referring to FIG. 19. As shown in FIG. 19, at Step 121, the lobby terminal 2 shown in FIG. 1 selects an expert clerk corresponding to the consulting detail of the user from the list of connectable expert clerks displayed at Step 110 shown in FIG. 16 by the selective function 23 of clerk terminal able to connect to lobby terminal and stores the selected list number, expert clerk code, and terminal ID code in the selective table 2300 of clerk terminal able to connect to lobby terminal shown in FIG. 8. Next, at Step 122, when there is no expert clerk corresponding to the consulting detail of the user at Step 121, the lobby terminal 2 selects tiae unattended agent server 3 shown in FIG. 1 and stores a terminal ID code corresponding to the unattended agent server 3 in the terminal ID code field 2303 of the selective table 2300 of clerk terminal able to connect to lobby terminal.

Figure 20:
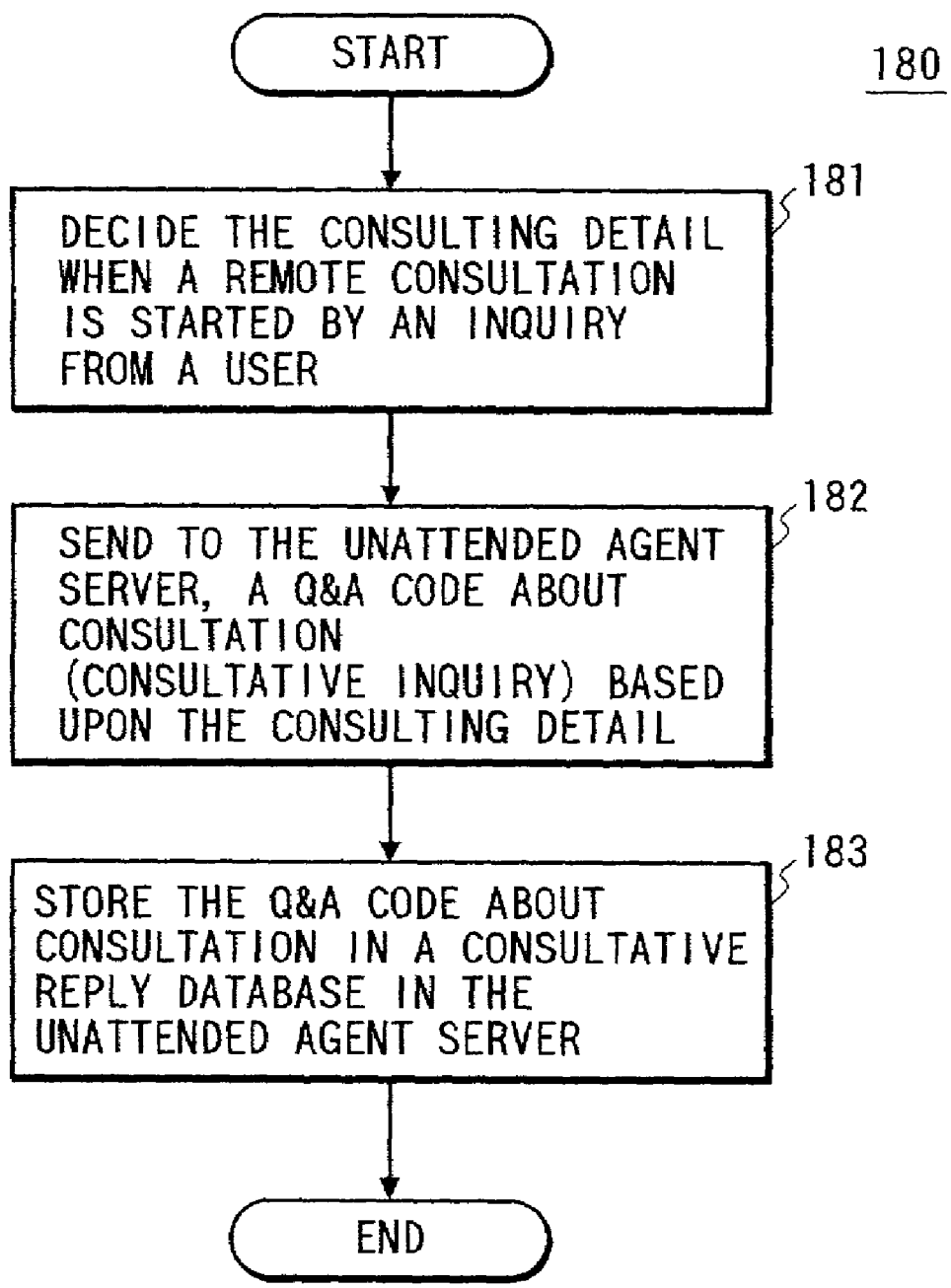
FIG. 20 is a detailed drawing of Step 180.

Next, Step 180 will be explained in detail by referring to FIG. 20. As shown in FIG. 20, at Step 181, the inquiry detail of the user from the lobby terminal 2 shown in FIG. 1 is sent to the unattended agent server 3(*f*) and the supplemental function 31 of Consultative information decides the consulting detail and stores it in the consulting detail field 3103 of the supplemental table of consultative information 3100 shown in FIG. 12(*g*). Next, at Step 182, the supplemental function 31 of consultative information sends the inquiry data on the basis of the consulting detail decided at Step 181 to the 5 unattended agent server 3(*f*) The supplemental function 31 of consultative information adds the code for the sent data and stores it in the Q&A code field about consultation 3105 of the information supply table shown in FIG. 12(*i*). Next, at Step 183, the supplemental function 31 of consultative information stores the Q&A data about consultation (inquiry data) in the store table of consultative inquiry and reply data 3200 shown in FIG. 13 by the store function 32 of consultative inquiry and replay data of the unattended agent server 3 and then stores it in the consultative reply database table 3300 and the Q&A code field 33101 about consultation and the consultation inquiry data field 33102 of the table 3310 shown in FIG. 14.

Figure 21:
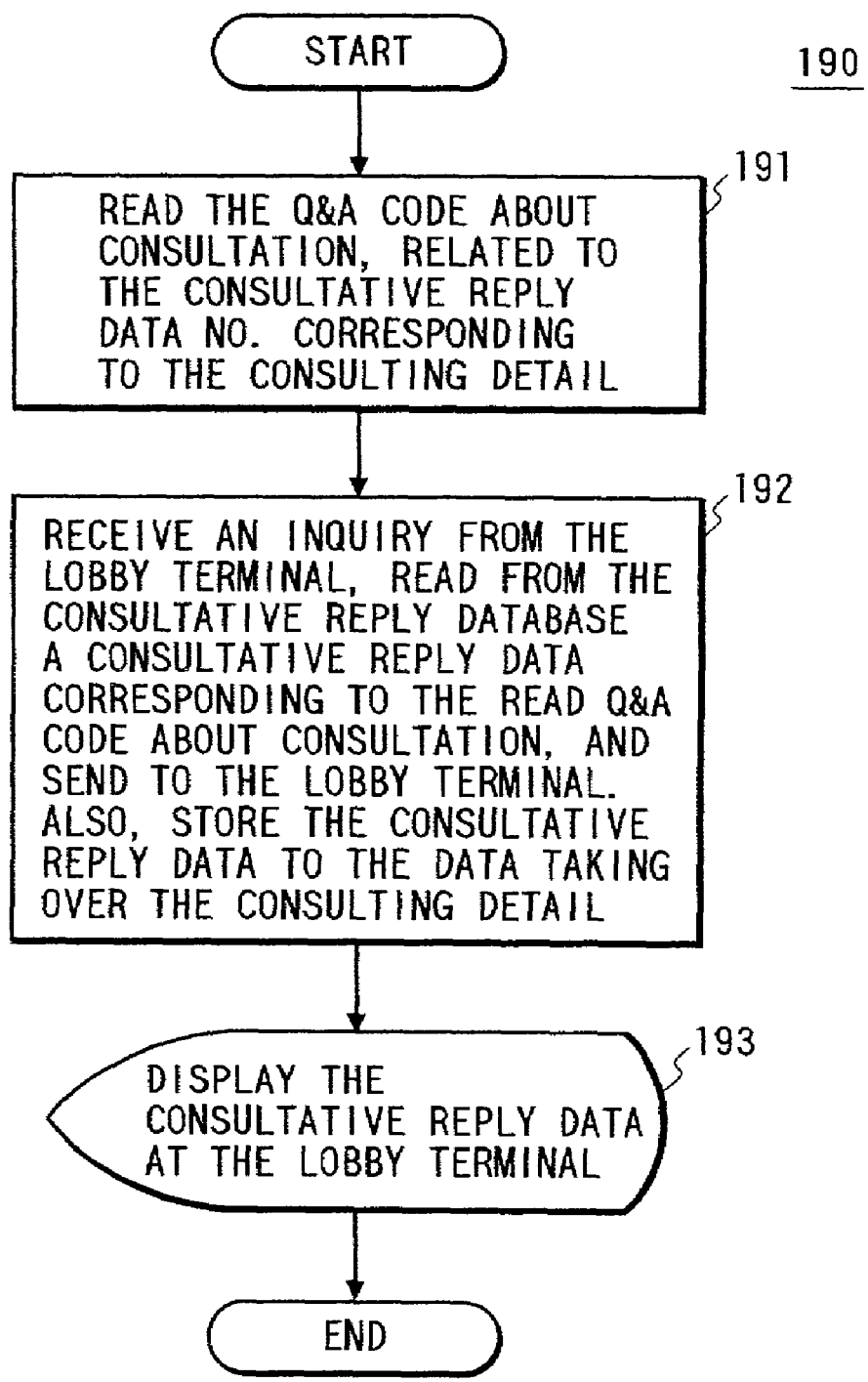
FIG. 21 is a detailed drawing of Step 190.

Next, Step 190 will be explained in detail by referring to FIG. 21. As shown in FIG. 21, at Step 191, the supplemental function 31 of consultative information of the unattended agent server 3 shown in FIG. 1 stores the past consultative reply data corresponding to the consulting detail decided at Step 180 in the consultation reply data field 33103 corresponding to the Q&A code field about consultation 33101 corresponding to the inquiry of the consultative reply database 33. Next, at Step 192, the supplemental function 31 of consultative information sends the consultative reply data stored at Step 191 to the lobby terminal 2 as a reply to the inquiry from the lobby terminal 2(*i*) With respect to the inquiry data from the user, the supplemental function 31 of consultative information stores it in the table of taking over the consulting detail 33200 of the consultative reply database 33 as data of taking over the consulting detail. Next, at Step 193, the supplemental function of consultative information 31 outputs and displays the consultative reply data sent to the lobby terminal 2 at Step 192 from the output unit 2002 shown in FIG. 2.

Figure 22:
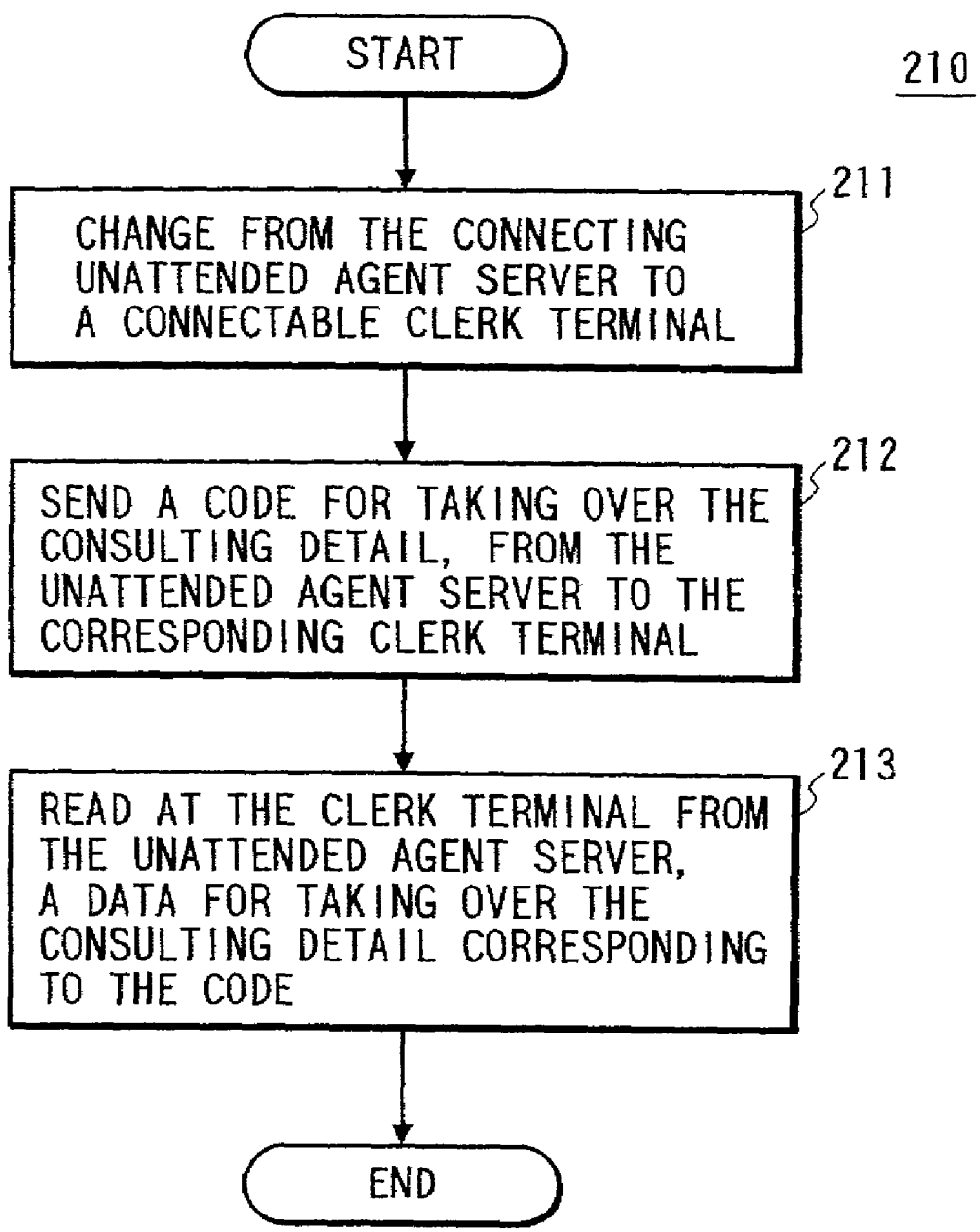
FIG. 22 is a detailed drawing of Step 210.

Next, Step 210 will be explained in detail by referring to FIG. 22. As shown in FIG. 22, at Step 211, if the clerk terminal 4 corresponding to the consulting detail of the user is made connectable by the server 1 for making a connection with clerk terminals controlling the connectable clerk terminals 4 in a uniform manner when data is exchanged between the lobby terminal 2 and the unattended agent server 3 shown in FIG. 1, the connecting unattended agent server 3 is changed to the connectable clerk terminal 4. Next, at Step 212, the code for taking over the consultative detail corresponding to the data for taking over the consulting detail (the table 33200) stored in the consultative reply database 33 is sent to the clerk terminal to be changed to from the unattended agent server 3 by the supplemental function 31(*k*) of consultative information and stored in the code field for taking over the consulting detail 4204 of the control table of a connection with clerk terminal 4200 shown in FIG. 10. Next, at Step 213, the data for taking over the consulting detail corresponding to the code for taking over the consulting detail stored at Step 212 is read from the table 33200 of the consultative reply database 33 of the unattended agent server 3 and outputted and displayed on the output unit 4002 of the clerk terminal 4 shown in FIG. 2.

Figure 23:
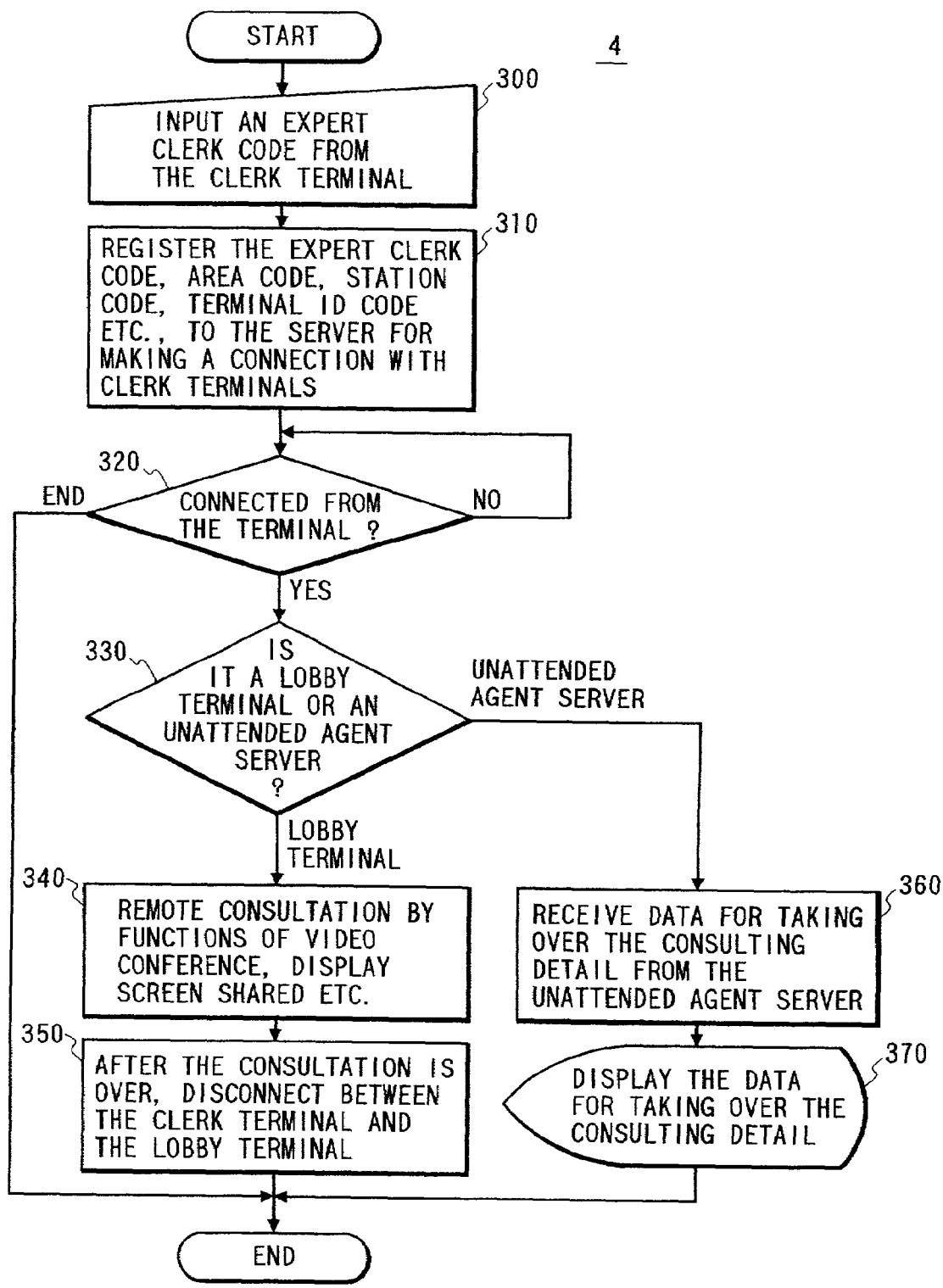
FIG. 23 is a flow chart showing an embodiment of the present invention mostly with a process in a clerk terminal.

Next, the process at the clerk terminal 4 is shown in FIG. 23.

At Step 300, the register function 41 of clerk terminal code able to connect to server of the clerk terminal 4 shown in FIG. 1 inputs an expert clerk code from the input unit 4001 of the clerk terminal 4 shown in FIG. 2 and stores the login time in the expert clerk code field 4101 and the login time field 4105 of the register table of clerk terminal code able to connect to server 4100 shown in FIG. 9. Next, at Step 310, the expert clerk code inputted at Step 300 and the logged-in area code, station code, and terminal ID code from the clerk terminal 4 are sent to the server 1(*l*) for making a connection with clerk terminals. Detailed processing at Step 310 will be described later by referring to FIG. 24. Next, at Step 320, the clerk terminal 4 decides whether there is a connection from the lobby terminal 2 or the unattended agent server 3 on the basis of the lobby terminal ID code 4201 in the table 4200 shown in FIG. 10. As a result of decision, when there is a connection from the lobby terminal 2 or the unattended agent server 3, the program goes to Step 330. On the other hand, when there is no connection, the decision at Step 320 is repeated until connected from the lobby terminal 2. When the expert clerk finishes the waiting to connect the lobby terminal from the clerk terminal 4, this process ends.

When the clerk terminal 4 relating to the consulting detail becomes connectable after the process ends, the clerk terminal 4 takes over exchange information with the lobby terminal 2 from the unattended agent server 3 and sends the reply data asynchronously using the lobby terminal 2 or another communication means such as telephone to the user or FAX. Next, at Step 330, the control function 42 of a connection with clerk terminal of the clerk terminal 4 shown in FIG. 1 decides whether the connected terminal is the lobby terminal 2 or the unattended agent server 3 on the basis of the lobby terminal status 4202 in the table 4200 shown in FIG. 10. As a result of decision, when the connected terminal is the lobby terminal 2, the program goes to Step 340. On the other hand, when the connected terminal is the unattended agent server 3, the program goes to Step 360. Next, at Step 340, the user and the expert clerk carry out remote consultation with each other using the functions of video conference, display screen shared, etc. via the connected lobby terminal 2.

Next, at Step 350, after the consultation is over, the logout time is stored in the logout time field 4303 in the completion table 4300 of a connection with clerk terminal shown in FIG. 11 by the completion function 43 of a connection with clerk terminal at the clerk terminal 4, and the judgment code for end of consultation (a connectable code is stored) is stored in the judgment code field for end of consultation 4304, and the communication with the connected lobby terminal 2 is disconnected. The judgment code for end of consultation is sent to the control table of clerk terminal connection 1100 of the server 1 for making a connection with clerk terminals shown in FIG. 3 together with the expert clerk code and terminal ID code, and a connectable code is stored in the connective status code field 1106, and "1" is added to the stored consulting frequency in the consulting frequency field 1105 while the clerk terminal connects server. On the other hand, at Step 360, the clerk terminal 4 receives exchange with the lobby terminal 2 from the unattended agent server 3 as data for taking over the consulting detail. Next, at Step 370, the data for taking over the consulting detail taken over from the unattended agent server 3 is displayed on the clerk terminal 4. Detailed processing at Steps 360 and 370 will be described later by referring to FIGS. 21 and 22, so that it is omitted here.

Figure 24:
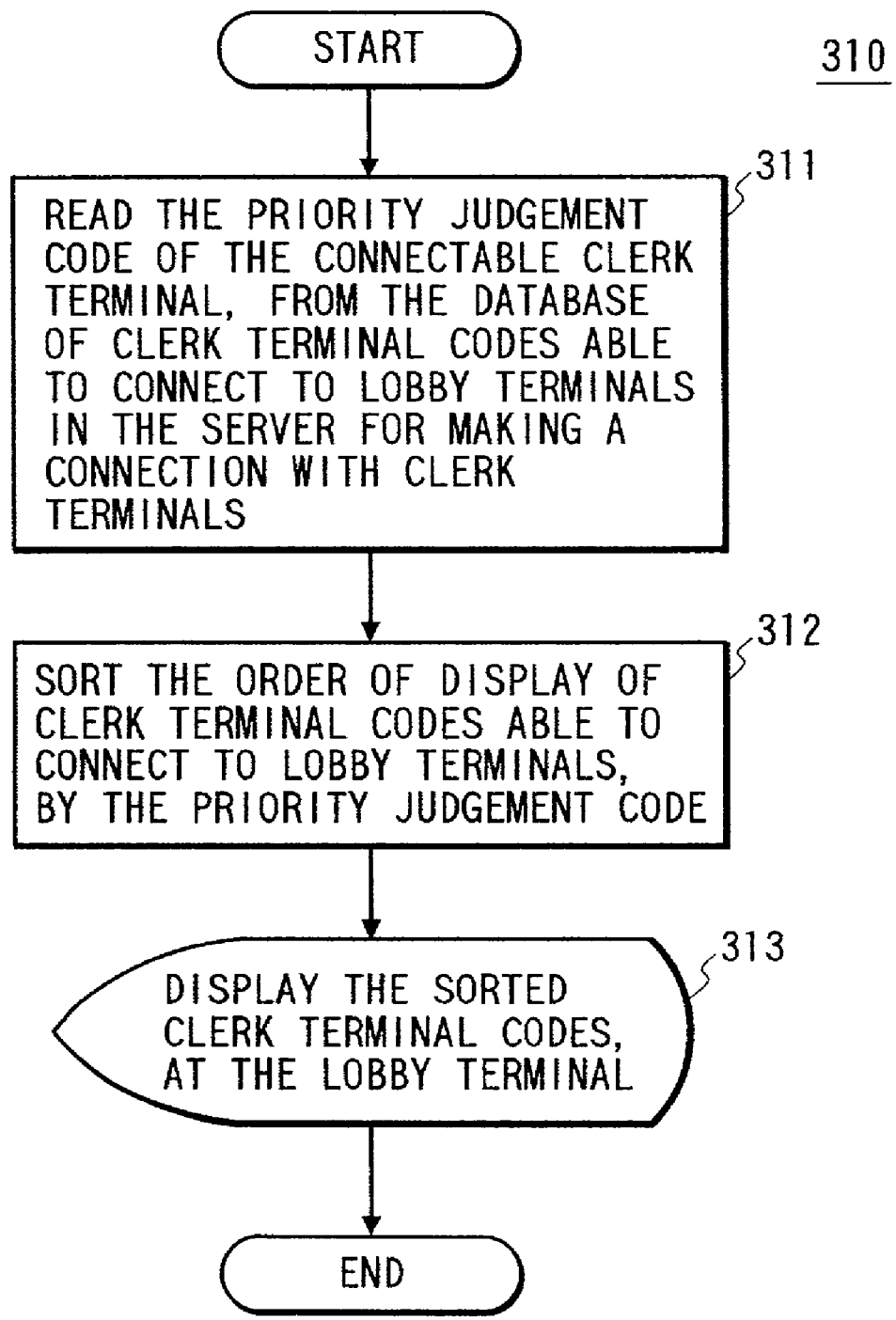
FIG. 24 is a detailed drawing of Step 310.

Next, Step 310 shown in FIG. 23 will be described in detail by referring to FIG. 24. As shown in FIG. 24, at Step 311, the priority judgment code stored in the priority judgment code field 14104 of the connectable clerk terminal 4 is read by the control function 12 of priority connection of clerk terminal of the server for making a connection with clerk terminals 1 shown in FIG. 1 from the table 14100 of the database 14 of clerk terminal codes able to connect to lobby terminals. Next, at Step 312, the order of display of clerk terminal codes able to connect to lobby terminals is sorted in the order of descending priorities (in the order of ascending consulting frequencies) on the basis of the priority judgment code when an expert clerk code correspondable to the same consulting detail is displayed at the lobby terminal 2. Next, at Step 313, the sorted result is stored in the control table 1200 of priority connection of clerk terminal shown in FIG. 4 so that the clerk terminal codes are displayed at the lobby terminal 2 in the order sorted at Step 312.

Figure 25:
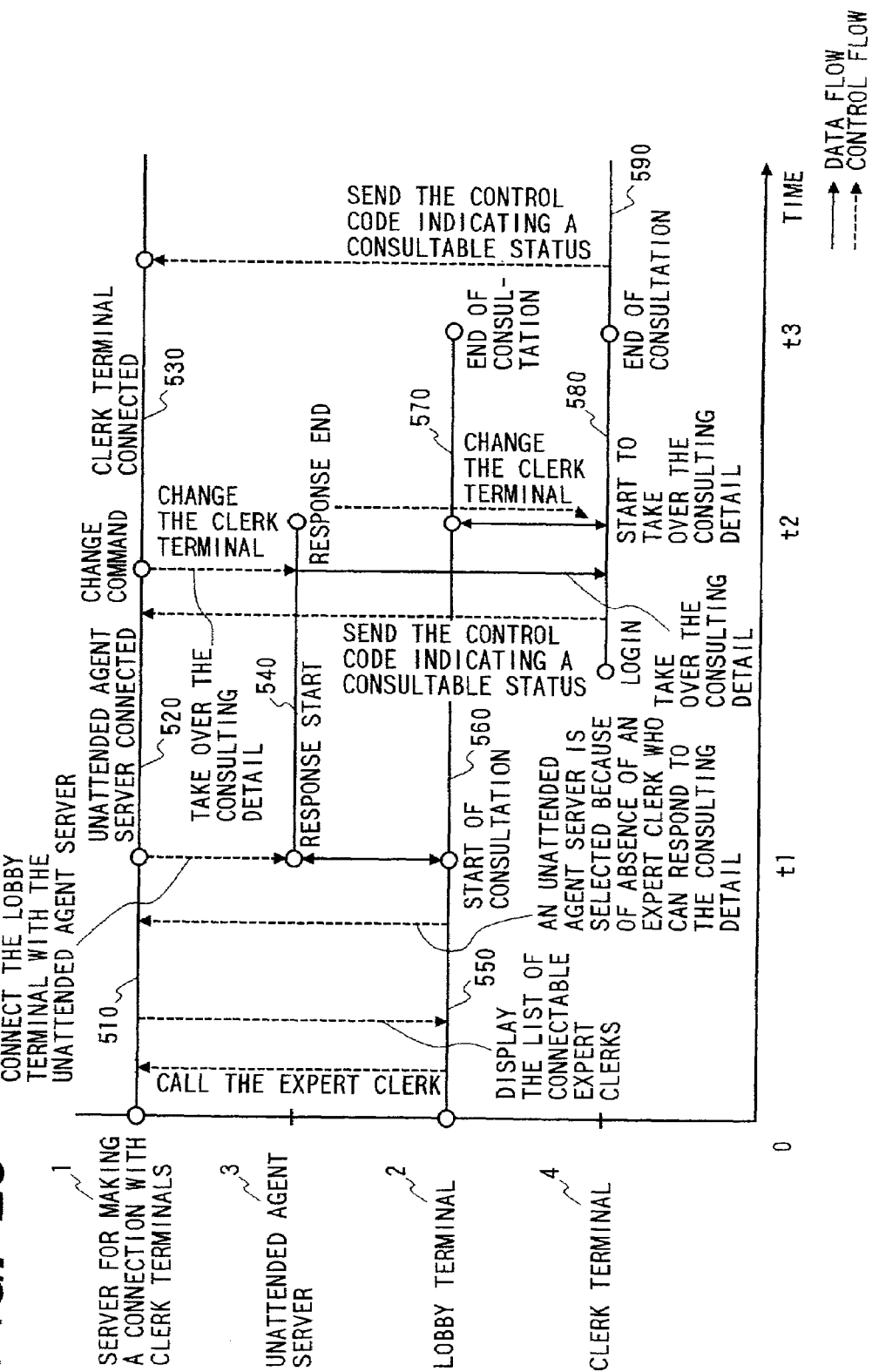
FIG. 25 is a time chart of an actual example of taking over from an unattended agent server to a clerk terminal.

Next, an actual example when a consultation is carried out from the lobby terminal 2 is shown in FIG. 25. FIG. 25 is a time chart showing the operating status of each terminal (the server 1 for making a connection with clerk terminals, the unattended agent server 3, the lobby terminal 2, the clerk terminal 4).

Firstly, the lobby terminal 2 starts the server 1 for making a connection with clerk terminals via the connective function 21 to clerk terminal (call instruction) shown in FIG. 1 (550). On the other hand, the server 1 for making a connection with clerk terminals receives a request from the lobby terminal via the control function of lobby terminal connection 13 and the control function 11 of clerk terminal connection sends display data of clerk terminal codes able to connect to lobby terminals to the lobby terminal 2 at the time of request (510). When there is no expert clerk who can correspond to the consulting detail in the clerk terminal codes able to connect to lobby terminals, the received lobby terminal 2 selects the unattended agent server 3. On the other hand, the server 1 for making a connection with clerk terminals connects the selected unattended agent server 3 and the lobby terminal 2.

Next, the unattended agent server 3 and the lobby terminal 2 are connected and the consultation starts (540, 560) (t1). The unattended agent server 3 retrieves the past reply data corresponding to the consulting detail from the consultative reply database 33 for the inquiry from the lobby terminal 2 and sends a reply to the lobby terminal 2 via the supplemental function 31 of consultative information. At the same time, the unattended agent server 3 stores data for taking over the consulting detail comprising an inquiry from the lobby terminal 2 and reply data from the unattended agent server 3 in the consultative reply database 33 by the store function 32 of consultative inquiry and replay data (the tables 33100, 33200). Furthermore, in this case, the server 1 for making a connection with clerk terminals confirms whether there is a connectable clerk terminal 4 corresponding to the consulting detail (520).

Next, when the clerk terminal 4 corresponding to the consulting detail becomes connectable while the unattended agent server 3 and the lobby terminal 2 are connected, the unattended agent server 3 is changed to the clerk terminal 4 by the server 1 for making a connection with clerk terminals controlling the status of clerk terminals in a uniform manner. When the unattended agent server 3 is changed to the clerk terminal 4, the data for taking over the consulting detail stored in the consultative reply database 33 is sent to the clerk terminal 4 via the store function 32 of consultative inquiry and replay data of the unattended agent server 3. After sending, the lobby terminal 2 and the clerk terminal 4 are connected and the consultation starts (t2). The connected expert clerk looks at the connection information from the unattended agent server 3 and continues the consultation with the user of the lobby terminal.

Information exchange between the lobby terminal 2 and the clerk terminal 4 is carried out by using the functions such as video conference and display screen shared (570, 580).

After the consultation is over, the clerk terminal 4 disconnects the communication with the lobby terminal (t3) and sends the information that it is connectable to another clerk terminal or the unattended agent server 3 to the server 1 for making a connection with clerk terminals by the completion function 43 of a connection with clerk terminal of the clerk terminal 4. The server 1 for making a connection with clerk terminals changes the connective status of the clerk terminal from "connected" (530) to "connectable status", displays the clerk terminal codes at the called lobby terminal, and waits for connection from the lobby terminal (590). Now, the explanation of an actual examination of the connection process using the time chart showing the operating status of each terminal (the server 1 for making a connection with clerk terminals, the unattended agent server 3, the lobby terminal 2, the clerk terminal 4) ends.

Figure 26:
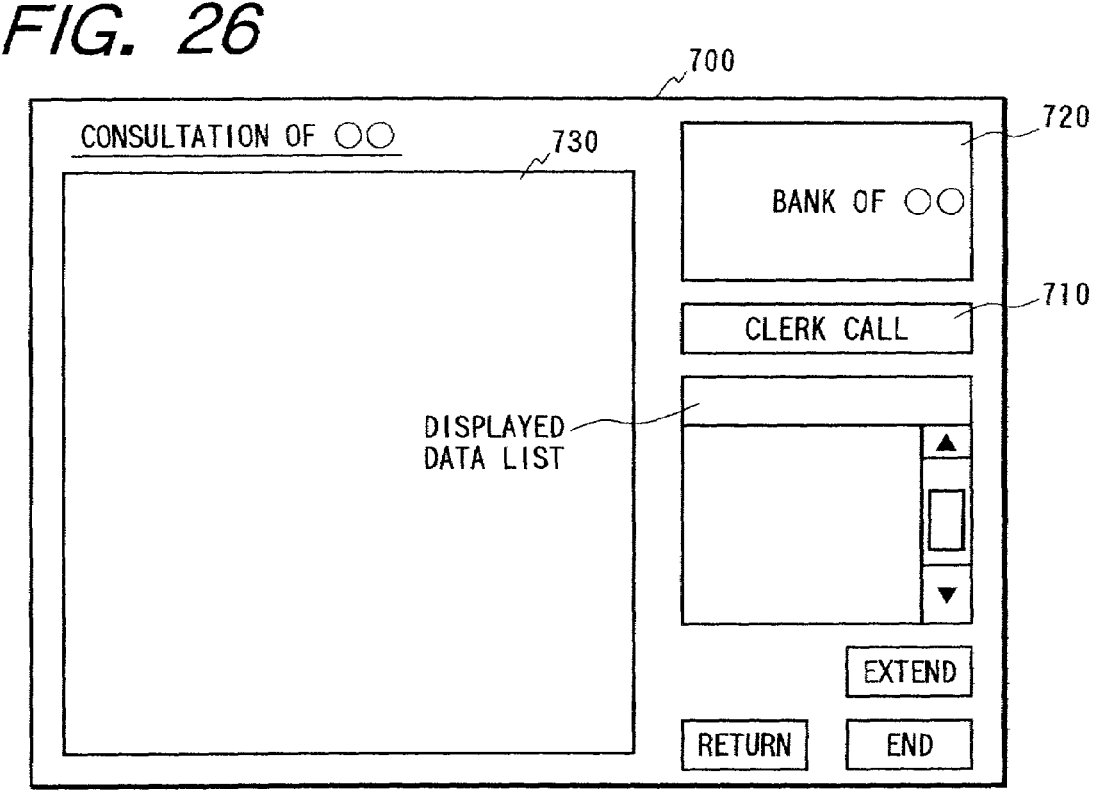
FIG. 26 is an example of a display screen from an output unit in a lobby terminal of the present invention when an expert clerk is called.
Figure 27:
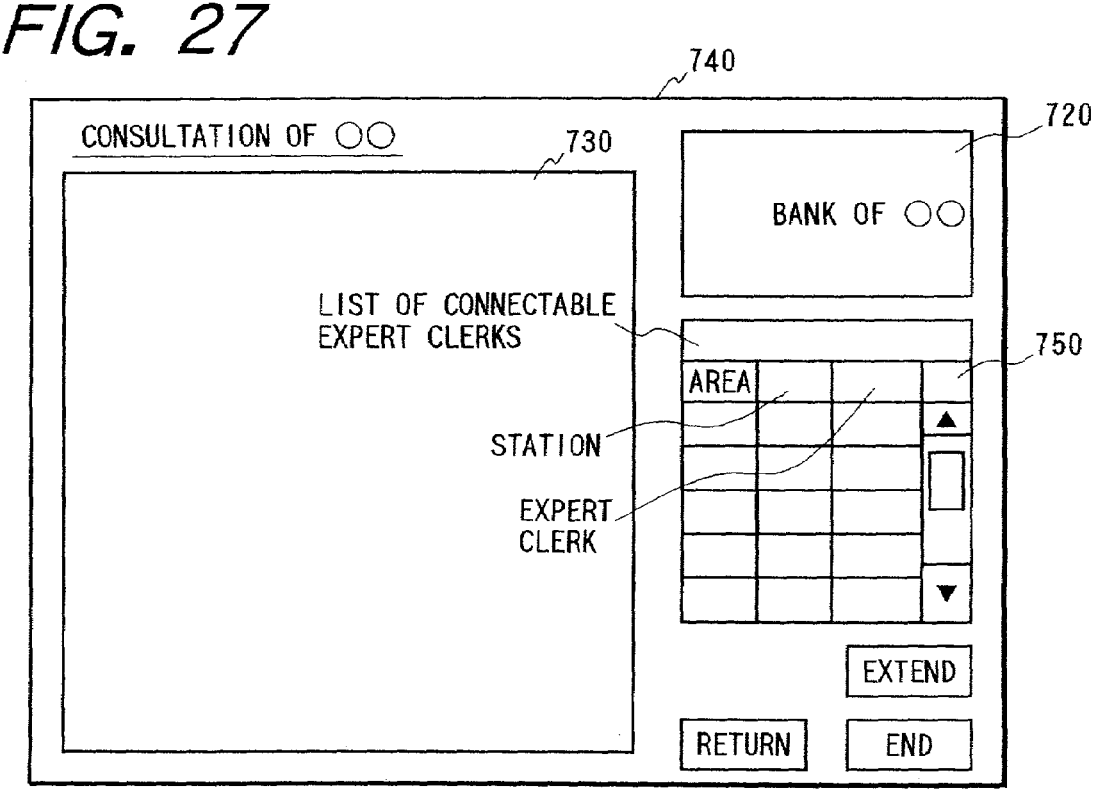
FIG. 27 is an example of a display screen from an output unit of clerk terminal codes of an expert clerk in a lobby terminal of the present invention.

Next, display screen examples of the output unit 2002 of the lobby terminal 2 shown in FIG. 2 are shown in FIGS. 26 and 27. A display screen 700 shown in FIG. 26 comprises a "clerk call" button 710 for calling a connectable expert clerk, a video conference screen 720 displayed when a clerk terminal is connected, and an operating area on display screen 730. FIG. 27 shows a screen layout when the display function 22 of clerk terminal codes able to connect to lobby terminals receives data from the server 1 for making a connection with clerk terminals and displays the clerk terminal codes able to connect to lobby terminals (740). The display screen 740 comprises the video conference screen 720, the operating area on display screen 730, and a display screen of clerk terminal codes able to connect to lobby terminals 750.

According to the present invention, to carry out a remote consultation by a user from the lobby terminal, it is possible to display connectable clerk terminal codes at the lobby terminal and select an expert clerk corresponding to a consultation from the user. When the expert clerk corresponding to the consulting detail of the user is not connectable, it is possible to connect to the unattended agent server first and supply the past consultative reply information regarding the consulting detail to the lobby terminal from the unattended agent server. On the other hand, when the expert clerk correspondable to the consulting detail enters the connectable state from the clerk terminal while the information is supplied to the lobby terminal from the unattended agent server, the server for making a connection with clerk terminals changes the unattended agent server to the clerk terminal halfway. When the clerk terminal is changed, the exchange with the lobby terminal by the unattended agent server is stored and taken over by the clerk terminal.

Therefore, when the user holds a consultation from the lobby terminal, even if the lobby terminal cannot be connected to an expert clerk correspondable to the consulting detail when the expert clerk is to be called, the unattended agent server corresponds to the consultation and when the correspondable expert clerk enters the connectable state. the unattended agent server takes over the consulting detail and changes the clerk terminal, so that the consultation disabled state from the user can be avoided. Even if the lobby terminal cannot be connected to the correspondable expert clerk until the consultation is over, when the consultable expert clerk is in the connectable state, the consulting detail from the user which is stored by the unattended agent server is taken over by the clerk terminal and the expert clerk can reply by using a communication means such as telephone and FAX.

What is claimed is:

1. A consulting system for replying to an inquiry from a customer, comprising:
   a plurality of clerk terminals for use by an expert clerk to reply to said inquiry from said customer; and
   a connection management apparatus for managing connections, said connection management apparatus comprising:
   monitoring means for monitoring connective status of each of said clerk terminals,
   storage means for storing data related to an expert clerk corresponding a connectable expert clerk terminal, extraction means for extracting said data related to said expert clerk corresponding said connectable expert clerk terminal, and sending means for sending a list of said data related to said expert clerk corresponding to said connectable expert clerk terminal, to a terminal for use by said customer, so that said customer can select an expert clerk related to said connectable clerk terminal; wherein:

each of said clerk terminals sends data showing that connection is possible to said connection management apparatus when connection with said terminal for use by said customer is ended, and said monitoring means of said connection management apparatus changes a connective status of said clerk terminal from "connected" to "connectable" based on said data showing connectable.

2. A consulting system according to claim 1, wherein said connection management apparatus comprises:

connecting means for connecting said terminal for use by said customer to an unattended agent server when there is no expert clerk corresponding to an inquiry from said customer;

judging means for judging that a clerk terminal corresponding said expert clerk to reply to said inquiry from said customer has become connectable, referring to said connective status of each of said clerk terminals;

changing means for changing connection of said terminal for use by said customer, from said unattended agent server to said clerk terminal that has become connectable, in accordance with the result of the judgment performed by said judging means, and sending means for sending communication between said customer and said unattended agent server to said clerk terminal that has become connectable.

3. A consulting system according to claim 1, further comprising:

an unattended agent server comprising:

storage means for storing past reply to said inquiry of said customer;

retrieving means for retrieving said past reply corresponding to said inquiry; and sending means for sending said past reply to said terminal for use by said customer, in accordance with said inquiry from said customer.

4. A consulting system according to claim 1, further comprising:

a terminal for use by said customer.

5. A consulting method for replying to an inquiry from a customer by using a consulting system having a connection management apparatus for managing connections, said method comprising the steps of:

monitoring connecting status of a plurality of clerk terminals for use by an expert clerk to reply to said inquiry of said customer;

storing data related to an expert clerk corresponding a connectable expert clerk terminal;

receiving said inquiry;

extracting said data related to said expert clerk corresponding said connectable expert clerk terminal in accordance with said inquiry from said customer;

sending a list of said data related to said expert clerk corresponding said connectable expert clerk terminal to a terminal for use by said customer so that said customer is able to choose an expert clerk corresponding said connectable expert clerk terminal; and sending data showing connectable to said connection management apparatus when said connection for said customer is terminated, wherein a connective status of said expert clerk terminal is changed from "connected" to "connectable" based on said data showing from said expert clerk terminal that has become connectable.

6. A connection management apparatus for managing connections between a first terminal for use by a customer and a plurality of second terminals for use by an expert clerk to reply to an inquiry from said customer, comprising:

monitoring means for monitoring a connective status of each of said second terminals;

storage means for storing data related to an expert clerk corresponding a connectable second terminal;

extraction means for extracting said data related to said expert clerk corresponding said connectable second terminal, in accordance with said inquiry from said customer; and sending means for sending a list of said data related to said expert clerk corresponding to said connectable second terminal to said first terminal for use by said customer so that said customer can select an expert clerk related to said connectable second terminal, and said monitoring means receiving data from said second terminal showing connectable when said connection of any one of said second terminals for said first terminal is terminated, and changing said connective status of said second terminal from "connected" to "connectable" based on said data showing said second terminal has become connectable from said second terminal.

7. A connection management apparatus according to claim 6, further comprising:

connecting means for connecting said first terminal for use by said customer to an unattended agent server when there is no expert clerk corresponding to an inquiry from said customer;

judging means for judging that a second terminal corresponding said expert clerk to reply to said inquiry from said customer has become connectable, referring to said connective status of each of said second terminals;

changing means for changing connection of said first terminal, from said unattended agent server to said second terminal that has become connectable, in accordance with the result of the judgment performed by said judging means; and sending means for sending communication between said customer and said unattended agent server to said second terminal that has become connectable.

8. A connection management apparatus according to claim 6, further comprising:

means for setting a priority of consultation of said expert clerk in accordance with the frequency of the past consultation of said expert clerk, wherein said extraction means extracts said data related to said expert clerk corresponding said connectable second terminal, in accordance with said priority.

9. A connection management method for managing connections between a first terminal for use by a customer and a plurality of second terminals for use by an expert clerk to reply to an inquiry from said customer, comprising steps of:

monitoring a connective status of each of said second terminals;

storing data related to an expert clerk corresponding said connectable second terminal;

extracting said data related to said expert clerk corresponding said connectable second terminal in accordance with said inquiry from said customer;

sending a list of said data related to said expert clerk corresponding said connectable second terminal to said first terminal so that said customer is able to choose an expert clerk corresponding said connectable second terminal;

sending data showing said second terminal is connectable when said connection of said second terminal for said first terminal has become terminated;

receiving data from said second terminal showing connectable when said connection of any one of said second terminals for said first terminal is terminated; and changing said connective status of said second terminal from "connected" to "connectable" based on said data from said second terminal that has become connectable.

* * * * *